(12) United States Patent
Park

(10) Patent No.: US 7,471,024 B2
(45) Date of Patent: Dec. 30, 2008

(54) APPARATUS FOR POWER TRANSMISSION BY MAGNETIC FORCE AND METHOD THEREOF

(75) Inventor: Man-Suk Park, A-102 Gyeongbu Yeollip 39-1, Sosa-dong, Wonmi-gu Bucheon-si, Gyeonggi-do, Seoul 420-818 (KR)

(73) Assignee: Man-Suk Park, Seoul (KR)

( * ) Notice: Subject to any disclaimer, the term of this patent is extended or adjusted under 35 U.S.C. 154(b) by 280 days.

(21) Appl. No.: 11/392,237

(22) Filed: Mar. 29, 2006

(65) Prior Publication Data

US 2007/0262665 A1 Nov. 15, 2007

Related U.S. Application Data

(63) Continuation-in-part of application No. 10/251,064, filed on Sep. 20, 2002, now Pat. No. 7,079,802.

(51) Int. Cl.
*H02K 53/00* (2006.01)
(52) U.S. Cl. ...................................................... 310/103
(58) Field of Classification Search ......... 310/103–104, 310/FOR. 100, 152, 75 D, 75 R; 417/360, 417/420; 198/502.1, 780, 789
See application file for complete search history.

(56) References Cited

U.S. PATENT DOCUMENTS 3,523,204 A * 8/1970 Rand ........................... 310/94
3,814,962 A * 6/1974 Baermann .................... 310/103
3,895,245 A * 7/1975 Bode ............................ 310/46
4,111,614 A * 9/1978 Martin et al. ................ 417/420
4,115,040 A * 9/1978 Knorr .......................... 417/420
4,163,164 A * 7/1979 Pieters ........................ 310/103
5,569,967 A * 10/1996 Rode .......................... 310/103

FOREIGN PATENT DOCUMENTS

JP 61085077 A * 4/1986
JP 11069768 A * 3/1999

* cited by examiner

*Primary Examiner*—Tran Nguyen
(74) *Attorney, Agent, or Firm*—Black Lowe & Graham PLLC

(57) ABSTRACT

An apparatus and a method for transmitting power using magnetic force. The apparatus comprises a driving rotary element rotated by a driving motor; and at least one driven rotary element brought into contact with the driving rotary element by an attractive force and rotated in an opposite direction relative to the driving rotary element by rotation of the driving rotary element. Each of the driving or driven rotary element comprises a double-sided bipolar disc shaped magnet or a disc-shaped ferromagnetic. A pair of double-sided bipolar disc-shaped magnets can be coupled to each other with a gear interposed therebetween. A rotary decoration can be coupled to an end of the driving rotary element or the driven rotary element. A small-sized power generator having light emitting diodes can be installed on a rotation shaft which is connected to the driving or driven rotary element.

31 Claims, 14 Drawing Sheets

US 7,471,024 B2

APPARATUS FOR POWER TRANSMISSION BY MAGNETIC FORCE AND METHOD THEREOF

PRIORITY CLAIM

This application claims priority from PCT application International Application No. PCT/KR2004/002403 having the priority date of Sep. 20, 2004 and is a Continuation-in-Part of application Ser. No. 10/251,064 entitled, "ROTATING APPARTUS USING MAGNET AND ROTATING DECORATION EMPLOYING THE SAME" and filed on Sep. 20, 2002 now U.S. Pat. No. 7,079,802 with the United States Patent and Trademark Office.

FIELD OF THE INVENTION

The present invention relates to an apparatus and a method for transmitting power using magnetic force, and more particularly, to an apparatus and a method for transmitting power using magnetic force, which can relatively rotate a plurality of driven rotary elements by virtue of one driving rotary element preferably composed of a double-sided bipolar disc-shaped magnet, thereby transmitting power without using other connection members.

BACKGROUND OF THE INVENTION

As generally known in the art, power transmitting apparatuses are constructed such that rotational power generated by a driving motor is transmitted to an object to be rotated, by means of connection members such as belts, gears, chains, and the like. In this regard, in the case that there exist a plurality of objects to be rotated, as an increased number of connection members are required, constructions of the power transmitting apparatuses become complicated and power loss increases due to rotational friction of the connection members.

In an effort to cope with these problems, a power transmitting apparatus using magnets has been disclosed in the art. This power transmitting apparatus using magnets can be advantageously employed when a separation member is interposed between a power source and an object to be rotated. The power transmitting apparatus is constructed such that a driving magnet is rotated by a driving motor to thereby rotate a driven magnet which is brought into contact with the driving magnet by a magnetic force. This type of power transmitting apparatus has been widely employed in various power transmitting mechanisms, a stirring machine used in a chemical laboratory, toys, and so forth.

Nevertheless, in the conventional power transmitting apparatus using magnets, in the case that there exist a plurality of objects to be rotated, an increased number of driving magnets are required in conformity with the number of the objects to be rotated, and the number of component parts used for rotating the driving magnets, such as shafts, belts, gears, chains, or the like also increases in proportion to the number of the objects to be rotated. Therefore, a construction of the power transmitting apparatus still becomes complicated, and ability to assemble the power transmitting apparatus is deteriorated. Also, operation noise is generated to a substantial level and a breakdown of the apparatus frequently occurs due to mechanical friction of the component parts. Further, as power loss increases due to rotational friction of the component parts, energy utilization efficiency becomes poor.

SUMMARY OF THE INVENTION

Accordingly, the present invention has been made to solve the above-mentioned problems occurring in the prior art, and an object of the present invention is to provide an apparatus and a method for transmitting power using magnetic force, which can relatively rotate a plurality of driven rotary elements by driving one driving rotary element to transmit power by a magnetic force without using other connection members, thereby decreasing the number of component parts required to serve as the connection members, simplifying a construction of the apparatus, and reducing mechanical friction and operation noise.

Another object of the present invention is to provide an apparatus and a method for transmitting power using magnetic force, which can minimize a contact area between rotary elements (by causing a line contact state in the case of coupling by an attraction force, or a non-contact state in the case of coupling by a repulsive force), thereby reducing energy loss due to frictional contact and power loss due to rotational friction between a plurality of component parts and improving energy utilization efficiency.

Still another object of the present invention is to provide an apparatus and a method for transmitting power using magnetic force, in which rotating decorations having a variety of shapes can be coupled to a plurality of driven rotary elements relatively rotated by one driving rotary element, thereby allowing various decorated patterns, advertising signs, toys, etc. to be easily constructed with a simple structure.

In order to achieve the above objects, according to one aspect of the present invention, there is provided an apparatus for transmitting, power using magnetic force, comprising: a driving rotary element rotated by a driving motor; and at least one driven rotary element brought into contact with the driving rotary element by an attractive force and rotated in an opposite direction relative to the driving rotary element by rotation of the driving rotary element.

According to another aspect of the present invention, each of the driving rotary element and the driven rotary element comprises a double-sided bipolar disc-shaped magnet or a disc-shaped ferromagnetic.

According to another aspect of the present invention, a circumferential outer surface of the driven rotary element is attractively brought into contact with a circumferential outer surface of the driving rotary element or another driven rotary element, to be relatively rotated.

At this time, according to another aspect of the present invention, each of the driving rotary element and the driven rotary element comprises a pair of attracting means each composed of a double-sided bipolar disc-shaped magnet; a gear interposed between the pair of attracting means; and release prevention plates attached to end surfaces of the attracting means, respectively, to prevent the driving and driven rotary elements which are brought into contact with each other, from being released.

According to another aspect of the present invention, a circumferential outer surface of each attracting means is brought into contact with a circumferential outer surface of attracting means of another driven rotary element, and the gear is meshed with a gear of the another driven rotary element to be relatively rotated.

According to another aspect of the present invention, a rotary decoration is coupled to an end of the driving rotary element or the driven rotary element.

According to another aspect of the present invention, a cam or a crankshaft is coupled to a rotating center of the driving rotary element or the driven rotary element, and the rotary decoration is coupled to an end of the cam or the crankshaft.

According to another aspect of the present invention, a small-sized power generator having light emitting diodes is installed on a rotation shaft which is connected to the driving rotary element or the driven rotary element.

According to another aspect of the present invention, the apparatus further comprises a housing for accommodating the driving rotary element and the driven rotary element; an accelerating driving magnet rotatably connected between and to the driving motor and the housing; and an accelerating driven magnet attractively brought into contact with the accelerating driving magnet and the housing, and rotated in an opposite direction relative to the accelerating driving magnet by rotation of the accelerating driving magnet to accelerate the housing.

According to another aspect of the present invention, a cylindrical wall is secured to a lower end surface of the housing, and a circumferential outer surface of the accelerating driven magnet is brought into contact with an inner surface of the cylindrical wall.

According to another aspect of the present invention, the apparatus further comprises at least one interlocking rotary element connected to the driven rotary element by a shaft, to be integrally rotated therewith; and an interlocked rotary element rotatably coupled to a shaft of the driving rotary element by way of a bearing, attractively brought into contact with the interlocking rotary element, and rotated in an opposite direction relative to the interlocking rotary element by rotation of the interlocking rotary element.

According to another aspect of the present invention, the interlocking rotary element comprises a double-sided bipolar disc-shaped magnet or a disc-shaped ferromagnetic.

According to another aspect of the present invention, the interlocked rotary element comprises a disc-shaped ferromagnetic having integrally formed therewith a frame to which a power-receiving member is connected.

According to another aspect of the present invention, a circumferential outer surface of the interlocking rotary element is brought into contact with a circumferential outer surface of the interlocked rotary element, to be relatively rotated.

According to another aspect of the present invention, the apparatus further comprises at least one interlocking rotary element positioned outside the housing, and connected to the driven rotary element by a shaft, to be integrally rotated therewith; and at least one perpendicular rotary element perpendicularly and eccentrically brought into contact with the interlocking rotary element, to be rotated.

According to another aspect of the present invention, each of the interlocking rotary element and the perpendicular rotary element comprises a double-sided bipolar disc-shaped magnet or a disc-shaped ferromagnetic.

According to another aspect of the present invention, the apparatus further comprises a motion conversion device for converting rotating motion of the driving rotary element into linear motion; and support bars coupled to the driven rotary element to reciprocate the driven rotary element by reciprocating motion of the motion conversion device.

According to another aspect of the present invention, the motion conversion device comprises a cam device or a crank device.

According to another aspect of the present invention, the apparatus further comprises a moving bar for connecting centers of the driving rotary element and the driven rotary element.

According to another aspect of the present invention, a wheel around which a friction ring is fitted is connected to the rotation shaft of the driven rotary element.

In the apparatus for transmitting power using magnetic force, according to another aspect of the present invention, the driving rotary element comprises a conveyor device.

According to another aspect of the present invention, the conveyor device comprises a chain coupled to the driven rotary element by a shaft; chain gears for rotatably driving the chain by rotational power of the driving rotary element; and a housing for accommodating the chain gears such that the chain gears are partially exposed to the outside through the housing.

The driven rotary element coupled to the chain by the shaft is brought into contact with an outer surface of the housing, to be relatively rotated by rotation of the chain.

According to another aspect of the present invention, the housing comprises a ferromagnetic.

According to another aspect of the present invention, the driven rotary element comprises a double-sided bipolar disc-shaped magnet or a disc-shaped ferromagnetic.

According to another aspect of the present invention, a circumferential outer surface of the driven rotary element is attractively brought into contact with a circumferential outer surface of another driven rotary element, to be relatively rotated.

According to another aspect of the present invention, each of the driving rotary element and the driven rotary element comprises a pair of attracting means each composed of a double-sided bipolar disc-shaped magnet; a gear interposed between the pair of attracting means; and release prevention plates attached to end surfaces of the attracting means, respectively, to prevent the driving and driven rotary elements which are brought into contact with each other, from being released.

According to another aspect of the present invention, a circumferential outer surface of each attracting means is brought into contact with a circumferential outer surface of attracting means of another driven rotary element, and the gear is meshed with a gear of the another driven rotary element to be relatively rotated.

According to another aspect of the present invention, a rotary decoration is coupled to an end of the driven rotary element.

According to another aspect of the present invention, a cam or a crankshaft is coupled to a rotating center of the driven rotary element, and the rotary decoration is coupled to an end of the cam or the crankshaft.

According to another aspect of the present invention, a small-sized power generator having light emitting diodes is installed on a rotation shaft which is connected to the driven rotary element.

Also, in order to achieve the above objects, according to another aspect of the present invention, there is provided an apparatus for transmitting power using magnetic force, comprising: a driving magnet section rotated by a driving motor; and at least one driven magnet section having the same polarity as the driving magnet section, and separated from the driving magnet section to be rotated in an opposite direction relative to the driving magnet section by a repulsive force of the driving magnet section.

According to another aspect of the present invention, each of the driving magnet section and driven magnet section comprises a cylindrical non-magnetic element for defining a rotation center; and one or more double-sided bipolar disc-shaped magnets coupled to a circumferential outer surface of the non-magnetic element to be spaced apart one from another by a regular angle.

According to another aspect of the present invention, each of the driving magnet section and driven magnet section comprises a double-sided bipolar magnet having a circumferential outer surface which is undulated into the combined shape of prominences and depressions.

According to another aspect of the present invention, a rotary decoration is coupled to an end of the driving magnet section or the driven magnet section.

According to another aspect of the present invention, a cam or a crankshaft is coupled to a rotating center of the driving magnet section or the driven magnet section, and the rotary decoration is coupled to an end of the cam or the crankshaft.

According to another aspect of the present invention, a small-sized power generator having light emitting diodes is installed on a rotation shaft which is connected to the driving magnet section or the driven magnet section.

According to another aspect of the present invention, the apparatus further comprises a housing for accommodating the driving magnet section and the driven magnet section; an accelerating driving magnet rotatably connected between and to the driving motor and the housing; and an accelerating driven magnet attractively brought into contact with the accelerating driving magnet and the housing, and rotated in an opposite direction relative to the accelerating driving magnet by rotation of the accelerating driving magnet to accelerate the housing.

According to another aspect of the present invention, a cylindrical wall is secured to a lower end surface of the housing, and a circumferential outer surface of the accelerating driven magnet is brought into contact with an inner surface of the cylindrical wall.

According to another aspect of the present invention, the apparatus further comprises at least one interlocking rotary element connected to the driven magnet section by a shaft, to be integrally rotated therewith; and an interlocked rotary element rotatably coupled to a shaft of the driving magnet section by way of a bearing, attractively brought into contact with the interlocking rotary element, and rotated in an opposite direction relative to the interlocking rotary element by rotation of the interlocking rotary element.

According to another aspect of the present invention, the interlocking rotary element comprises a double-sided bipolar disc-shaped magnet or a disc-shaped ferromagnetic.

According to another aspect of the present invention, the interlocked rotary element comprises a disc-shaped ferromagnetic having integrally formed therewith a frame to which a power-receiving member is connected.

According to another aspect of the present invention, a circumferential outer surface of the interlocking rotary element is brought into contact with a circumferential outer surface of the interlocked rotary element, to be relatively rotated.

Further, in order to achieve the above objects, according to still another aspect of the present invention, there is provided a method for transmitting power using magnetic force, comprising the step of: bringing, by an attractive force, a circumferential outer surface of a disc-shaped driving rotary element rotated by a driving motor into contact with a circumferential outer surface of at least one disc-shaped driven rotary element, and thereby rotating the driven rotary element in an opposite direction relative to the driving rotary element by rotation of the driving rotary element.

According to another aspect of the present invention, each of the driving rotary element and the driven rotary element comprises a double-sided bipolar disc-shaped magnet or a disc-shaped ferromagnetic.

According to another aspect of the present invention, each of the driving rotary element and the driven rotary element comprises a pair of attracting means each composed of a double-sided bipolar disc-shaped magnet; a gear interposed between the pair of attracting means; and release prevention plates attached to end surfaces of the attracting means, respectively, to prevent the driving and driven rotary elements which are brought into contact with each other, from being released.

According to another aspect of the present invention, a circumferential outer surface of each attracting means is brought into contact with a circumferential outer surface of attracting means of another driven rotary element, and the gear is meshed with a gear of the another driven rotary element to be relatively rotated.

Still further, in order to achieve the above objects, according to still another aspect of the present invention, there is provided a method for transmitting power using magnetic force, comprising the step of: separately locating a driving magnet section rotated by a driving motor and at least one driven magnet section having the same polarity as the driving magnet section from each other, and thereby rotating the driven magnet section in an opposite direction relative to the driving magnet section by a repulsive force through the rotation of the driving magnet section.

According to another aspect of the present invention, each of the driving magnet section and driven magnet section comprises a cylindrical non-magnetic element for defining a rotation center; and one or more double-sided bipolar disc-shaped magnets coupled to a circumferential outer surface of the non-magnetic element to be spaced apart one from another by a regular angle.

According to another aspect of the present invention, each of the driving magnet section and driven magnet section comprises a double-sided bipolar magnet having a circumferential outer surface undulated into the combined shape of prominences and depressions.

BRIEF DESCRIPTION OF THE DRAWINGS

Preferred and alternative embodiments of the present invention are described in detail below with reference to the following drawings:

FIG. 1 is of views for explaining a parallel power transmitting principle in an apparatus for transmitting power using magnetic force in accordance with an embodiment of the present invention;

FIG. 2 is of views for explaining a perpendicular power transmitting principle in the apparatus for transmitting power using magnetic force in accordance with the embodiment of the present invention;

FIG. 3 is of views for explaining a power transmitting principle between magnets coupled with gears in the apparatus for transmitting power using magnetic force in accordance with the embodiment of the present invention;

FIG. 5 is of views illustrating the apparatus for transmitting power using magnetic force in accordance with the embodiment of the present invention, which has a speed-changing function;

FIG. 5b is a longitudinal cross-sectional view illustrating a rotating structure which is obtained by removing some shafts from the multi-shaft rotating structure shown in FIG. 5a;

FIG. 5e is a transverse cross-sectional view illustrating an arrangement of magnets which are provided in a housing in the structures shown in FIGS. 5a through 5d;

FIG. 6 is of views illustrating the apparatus for transmitting power using magnetic force in accordance with the embodiment of the present invention, which simultaneously implements reciprocating motion and rotating motion;

FIG. 8 is of views illustrating the apparatus for transmitting power using magnetic force in accordance with the embodiment of the present invention, which is coupled with a conveyor device;

FIG. 9 is of views for explaining a power transmitting principle in an apparatus for transmitting power using magnetic force in accordance with another embodiment of the present invention;

FIG. 11 is of views illustrating the apparatus for transmitting power using magnetic force in accordance with another embodiment of the present invention, which has a speed-changing function;

DETAILED DESCRIPTION OF THE PREFERRED EMBODIMENT

Figure 1A:
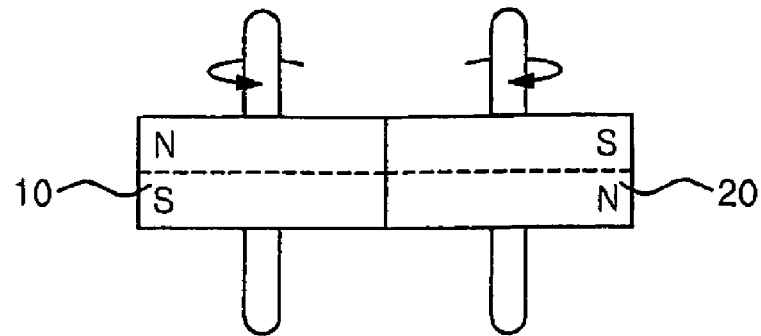
FIG. 1a is a front view illustrating a state in which a driving magnet and a driven magnet are rotated with their circumferential outer surfaces attractively brought into contact with each other.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 1B:
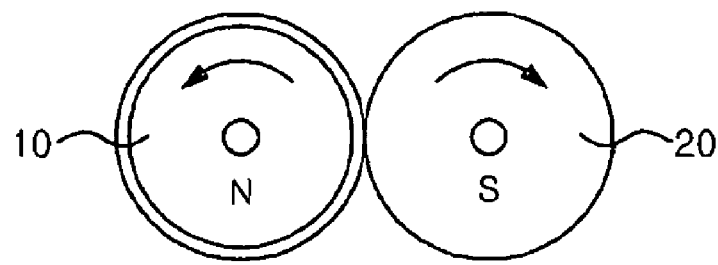
FIG. 1b is the state in which a driving magnet and a driven magnet are rotated with their circumferential outer surfaces attractively brought into contact with each other.
Figure 1C:
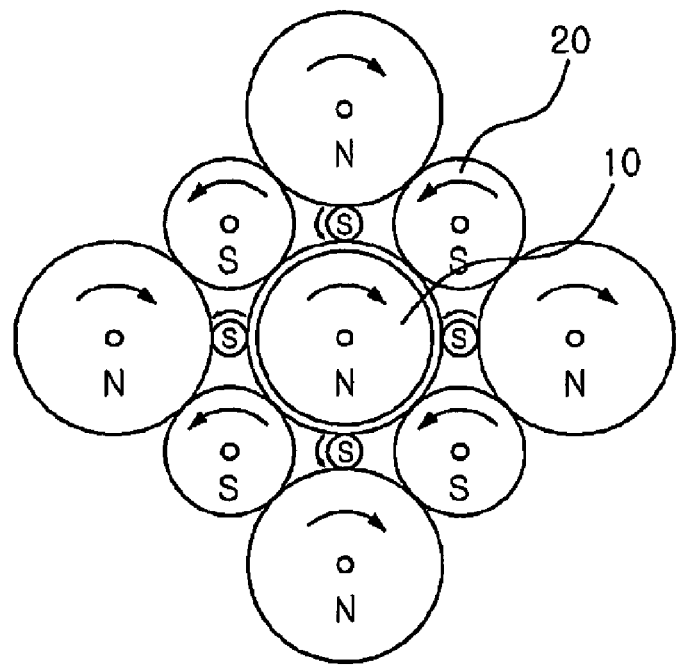
FIG. 1c is a plan view illustrating a state in which a driving magnet and a plurality of driven magnets having different sizes are rotated with their circumferential outer surfaces attractively brought into contact one with another.

FIG. 1 is of views for explaining a parallel power transmitting principle in an apparatus for transmitting power using magnetic force in accordance with an embodiment of the present invention, wherein FIG. 1a is a front view illustrating a state in which a driving magnet and a driven magnet are rotated with their circumferential outer surfaces attractively brought into contact with each other, FIG. 1b is a plan view of FIG. 1a, and FIG. 1c is a plan view illustrating a state in which a driving magnet and a plurality of driven magnets having different sizes are rotated with their circumferential outer surfaces attractively brought into contact one with another.

Referring to FIGS. 1a and 1b, a circumferential outer surface of a driven rotary element 20 which is composed of a double-sided bipolar disc-shaped magnet is brought into contact with a circumferential outer surface of a driving rotary element 10 which is coupled to a driving motor by a shaft and is preferably composed of a double-sided bipolar disc-shaped magnet, by an attractive force.

If the driving rotary element 10 is rotated in one direction, the driven rotary element 20 is rotated in an opposite direction relative to the driving rotary element 10. The reason to this is that a magnetic attractive force induced between magnets serves as a kind of a vertical drag force at a line-contact region between the magnets, and relative rotation occurs by action and reaction due to a frictional force which is generated in proportion to the vertical drag force. At this time, magnetic forces of the driving and driven rotary elements 10 and 20 are equilibrated along a line of magnetic force, which causes the relative rotation to easily occur while lessening rotation resistance despite the storing attractive force. The driving and driven rotary elements 10 and 20 having the disc-shaped configurations are formed to have smooth outer surfaces so that frictional resistance can be minimized while the relative rotation occurs. As a consequence, the driving rotary element 10 is driven to rotate with minimum rotational resistance and frictional resistance. Also, the driven rotary element 20 which is brought into contact with the driving rotary element 10 is relatively rotated at the same rotational velocity as the driving rotary element 10, so that rotational power can be transmitted with minimum power loss without using separate connection members, and thereby it is possible to construct rotating devices and products having a diversity of configurations.

In FIG. 1c, the power transmitting structure is extended to a structure in which a plurality of driven rotary elements are continuously brought into contact with the driving rotary element 10 and with one another. Referring to FIG. 1c, a driving rotary element 10 comprising a double-sided bipolar disc-shaped magnet which is coupled to a driving motor is located at a center, and a plurality of driven rotary elements 20 each comprising a double-sided bipolar disc-shaped magnet are brought into contact with the driving rotary element 10 and with one another. The magnets constituting the driven rotary elements 20 can be changed in their sizes, and ferromagnetics can be used in place of some magnets. When the sizes of the magnets are changed, different rotational velocities result in. Also, when ferromagnetics are used in place of some magnets, the ferromagnetics must not be brought into contact with each other, and instead, contact must necessarily occur between a ferromagnetic and a magnet.

As can be readily seen from FIG. 1c, in a state in which the plurality of driven rotary elements 20 are continuously and closely located around one driving rotary element 10 to be attractively brought into contact with the driving rotary element 10 and with one another, by driving and rotating one driving rotary element 10, it is possible to rotate the plurality of driven rotary elements 20 with minimum power and transmit power to a multitude of shafts without using separate connection members. This forms a basis of a principle in which a power transmitting apparatus can be constructed so that a multitude of shafts can be driven with a strong support force while minimizing rotational and frictional resistances without using separate connection members.

Figure 2A:
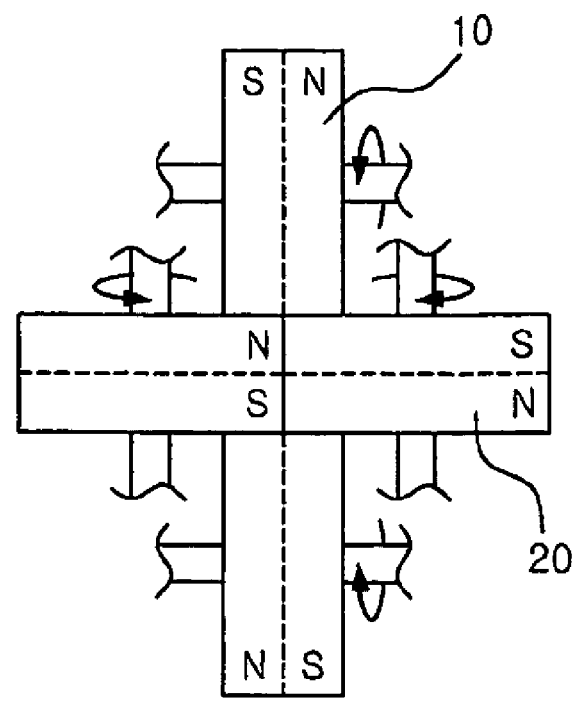
FIG. 2a is a front view illustrating a state in which driving rotary elements and driven rotary elements are rotated with circumferential outer surfaces of the driving rotary elements attractively brought into contact with upper and lower surfaces of the driven rotary elements.
Figure 2B:
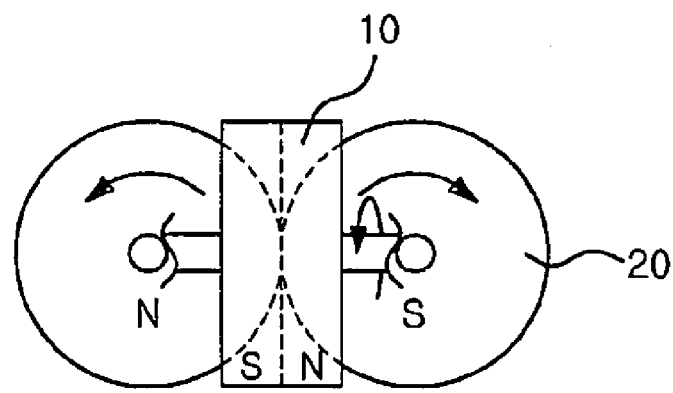
FIG. 2b is a plan view illustrating a state in which driving rotary elements and driven rotary elements are rotated with circumferential outer surfaces of the driving rotary elements attractively brought into contact with upper and lower surfaces of the driven rotary elements.

FIG. 2 is of views for explaining a perpendicular power transmitting principle in the apparatus for transmitting power using magnetic force in accordance with the embodiment of the present invention, wherein FIG. 2a is a front view illustrating a state in which driving rotary elements and driven rotary elements are rotated with circumferential outer surfaces of the driving rotary elements attractively brought into contact with upper and lower surfaces of the driven rotary elements, and FIG. 2b is a plan view of FIG. 2a.

Referring to FIG. 2, driving rotary elements 10 and driven rotary elements 20 each of which comprises a double-sided bipolar disc-shaped magnet are vertically and eccentrically coupled to each other and rotated relative to each other.

As shown in the drawings, the driving and driven rotary elements 10 and 20 are coupled to each other in the shape of a cross. If an upper driving rotary element 10 is rotated in one direction as indicated by the arrow, the driven rotary elements 20 are relatively rotated in a direction which is perpendicular to the one direction. The reason to this is that, since the driven rotary elements 20 are eccentrically coupled to the driving rotary elements 10, strong magnetic attractive forces act to the portions of the driven rotary elements 20 which are adjacent to the driving rotary elements 10, and relatively weak magnetic attractive forces act to the portions of the driven rotary elements 20 which are remote from the driving rotary elements 10. That is to say, because a magnetic attractive force corresponds to a vertical drag force and a frictional force is proportional to the vertical drag force, as the strong magnetic attractive forces act to the portions of the driven rotary elements 20 which are adjacent to the driving rotary elements 10, rotation torques are induced in the driven rotary elements 20 to rotate the driven rotary elements 20 relative to the driving rotary elements 10.

Figure 3A:
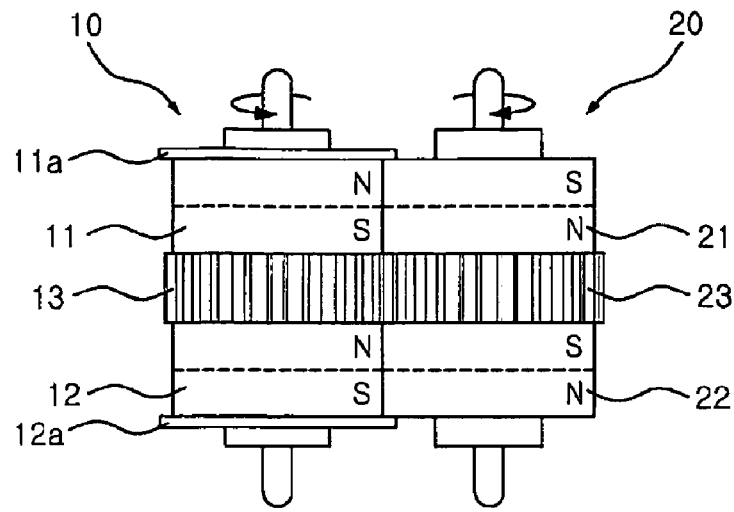
FIG. 3a is a front view illustrating a state in which a driving rotary element and a driven rotary element respectively coupled with gears are rotated with their circumferential outer surfaces attractively brought into contact with each other.
Figure 3B:
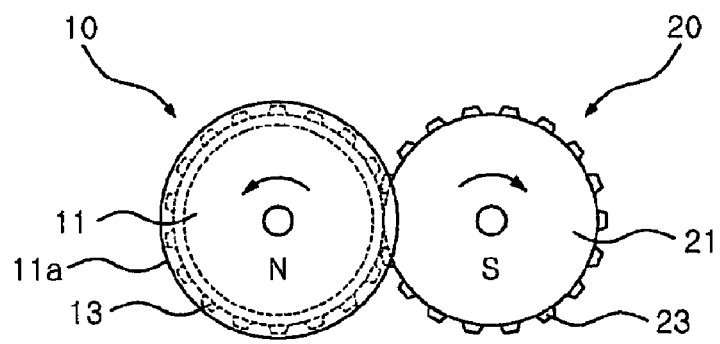
FIG. 3b is a plan view illustrating a state in which a driving rotary element and a driven rotary element respectively coupled with gears are rotated with their circumferential outer surfaces attractively brought into contact with each other.
Figure 3C:
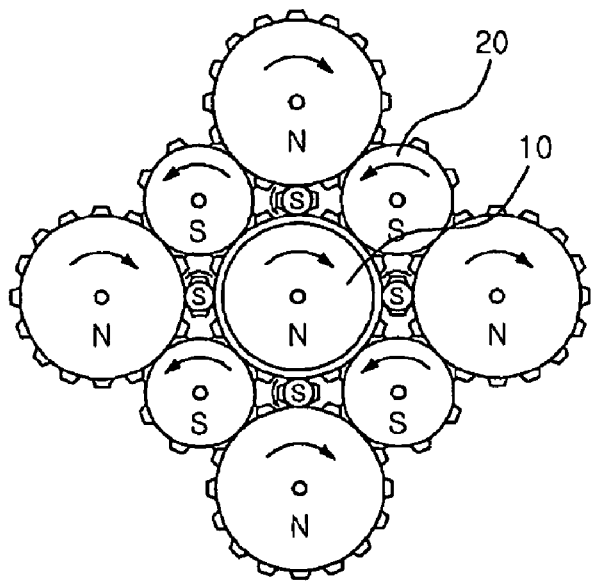
FIG. 3c is a plan view illustrating a state in which a driving rotary element coupled with a gear and a plurality of driven rotary elements having different sizes and coupled with gears are rotated with their circumferential outer surfaces attractively brought into contact one with another.

FIG. 3 is of views for explaining a power transmitting principle between magnets coupled with gears in the apparatus for transmitting power using magnetic force in accordance with the embodiment of the present invention, wherein FIG. 3a is a front view illustrating a state in which a driving rotary element and a driven rotary element respectively coupled with gears are rotated with their circumferential outer surfaces attractively brought into contact with each other, FIG. 3b is a plan view of FIG. 3a, and FIG. 3c is a plan view illustrating a state in which a driving rotary element coupled with a gear and a plurality of driven rotary elements having different sizes and coupled with gears are rotated with their circumferential outer surfaces attractively brought into contact one with another.

Referring to FIG. 3, gears 13 and 23 are coupled to a driving rotary element 10 and a driven rotary element 20, respectively. In this case, it is preferred that each of the driving rotary element 10 and the driven rotary element 20 comprises a pair of attracting means 11, 12, and 21, 22 each composed of a double-sided bipolar disc-shaped magnet, with a gear 13 and 23 interposed between the pair of attracting means 11, 12 and 21, 22. It can be envisaged that a gear is formed integrally on a circumferential outer surface of a single magnet.

At this time, it is also preferred that release prevention plates 11a and 12a are attached to end surfaces, respectively, of the driving or driven rotary element 10 and 20 to prevent the driving and driven rotary elements 10 and 20 which are brought into contact with each other, from being released.

In this gear-meshing structure, since the driving and driven rotary elements 10 and 20 can be rotated relative to each other while being brought into contact with each other by an attractive force, with teeth of the gears 13 and 23 meshed with each other, it is possible to improve a precision of a power transmitting structure in comparison with the structure in which magnets are simply brought into line-contact with each other. Also, when compared to a structure in which only two gears are meshed with each other, it is possible to obtain a strong coupling force without using a separate shaft supporting mechanism, and it is possible to simply construct a machine without using separate connection members.

The double-sided bipolar disc-shaped magnet constituting the driving rotary element 10 and the driven rotary element 20 preferably comprises a permanent magnet, and more preferably, comprises a neodymium magnet which is based on neodymium, ferric oxide and boron. It is preferred that urethane resin, Teflon resin, etc. are coated on an outer surface of the magnet to prevent corrosion or breakage of the magnet. Moreover, it is preferable to thermally treat surfaces of the gears which are interposed between the magnets with an aim to minimize an abrasion rate upon rotation.

Figure 4:
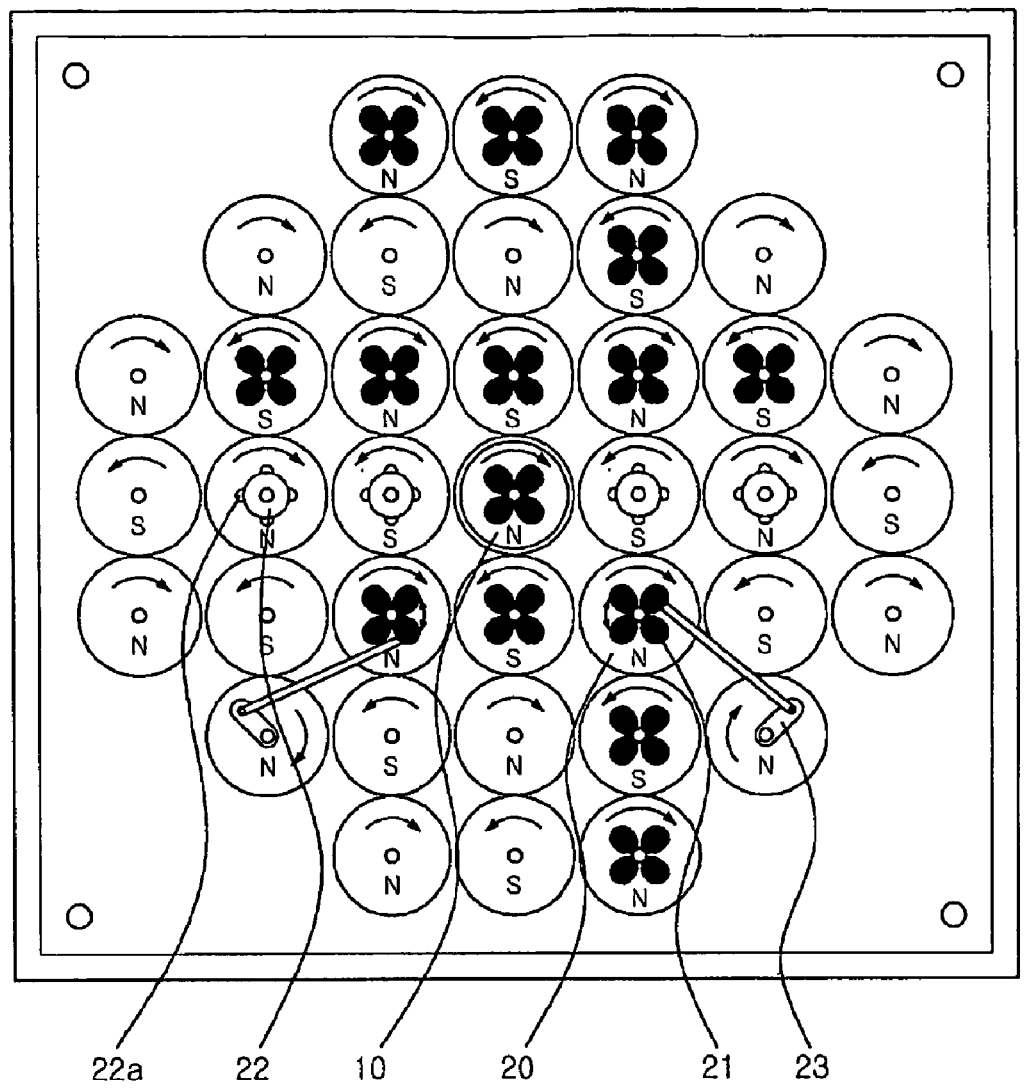
FIG. 4 is a plan view illustrating a state in which decorations having various shapes are coupled to the apparatus for transmitting power using magnetic force in accordance with the embodiment of the present invention.

FIG. 4 is a plan view illustrating a state in which decorations having various shapes are coupled to the apparatus for transmitting power using magnetic force in accordance with the embodiment of the present invention.

Referring to FIG. 4, a driving rotary element 10 which is driven by a driving motor is located at a center, and a plurality of driven rotary elements 20 are continuously and closely located around the driving rotary element 10 to be attractively brought into contact with the driving rotary element 10 and with one another.

Each of the driving rotary element 10 and the driven rotary elements 20 may comprise a double-sided bipolar disc-shaped magnet or a disc-shaped ferromagnetic. Alternatively, a pair of double-sided bipolar disc-shaped magnets can be coupled to each other with a gear interposed therebetween.

Rotating decorations 21 having various configurations can be coupled to upper ends of the driving and driven rotary elements 10 and 20. The rotating decorations 21 may be coupled directly or indirectly by way of crankshafts 23 to rotation shafts of the driving and driven rotary elements 10 and 20. The rotating decorations 21 may have a general decorative feature such as a flower, an animal, etc. and a functional decorative feature such as an electric fan, etc. In the case of direct coupling, the rotating decorations 21 simply implement rotating motion. In the case of indirect coupling by way of the crankshafts 23, the rotating decorations 21 implement rotating motion and reciprocating motion. In the illustrated example, the rotating decorations directly coupled to the rotation shafts of the driving and driven rotary elements 10 and 20 denote the Korean letter which is read as 'guk' in English and implement only rotating motion, and the rotating decorations indirectly coupled by way of the crankshafts to the rotation shafts of the driving and driven rotary elements 10 and 20 implement reciprocating and rotating motions due to the presence of the crankshafts. To this end, the rotating decorations connected to the crankshafts are coupled to the driven rotary elements to idly rotate about the rotation shafts of the driven rotary elements.

It can be contemplated that small-sized generators 22 each having light-emitting diodes 22a are installed on the rotation shafts of the driven rotary elements 20. Due to the fact that rotational power transmitted by the driving motor is converted into electrical energy by the small-sized generators 22 to turn on the light-emitting diodes 22a, the structure can be advantageously employed in a product which has a partitioning member or rotates at a high velocity so that it is difficult to lay electric wires in the product.

Due to the fact that the plurality of driven rotary elements 20 are continuously and closely located around the driving rotary element 10 to be attractively brought into contact with the driving rotary element 10 and with one another, a strong attractive support force is obtained, by which it is possible to omit a majority of the rotation shafts of the driving and driven rotary elements 10 and 20.

As described above, in the apparatus for transmitting power using magnetic force according to this embodiment of the present invention, since the rotating decorations having a variety of shapes can be coupled in a diversity of ways to the driving and driven rotary elements, various decorative patterns, advertising signs, toys, etc. can be easily constructed with a simple structure.

Figure 5A:
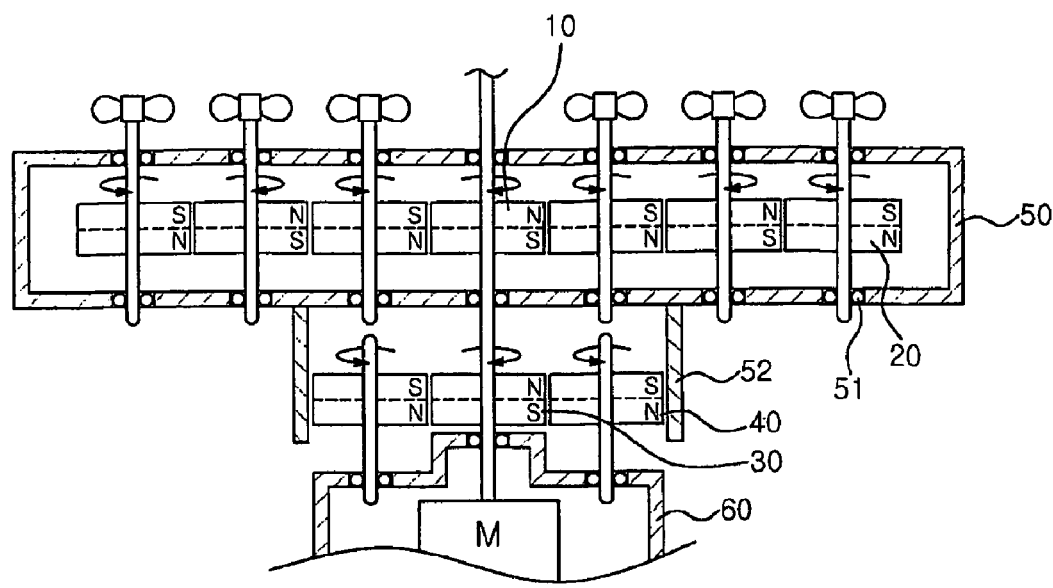
FIG. 5a is a longitudinal cross-sectional view illustrating a multi-shaft rotating structure.
Figure 5B:
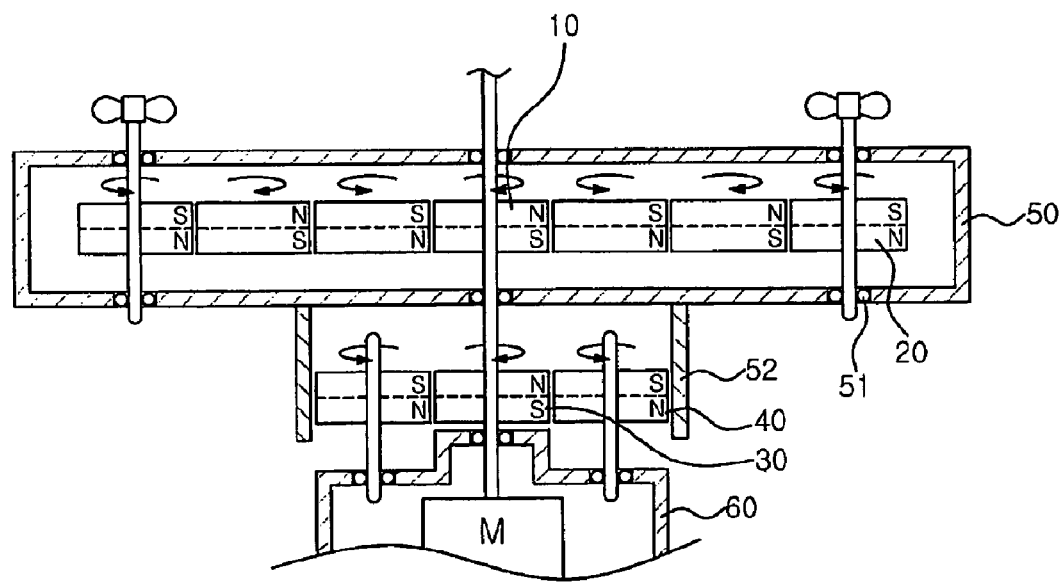
Figure 5C:
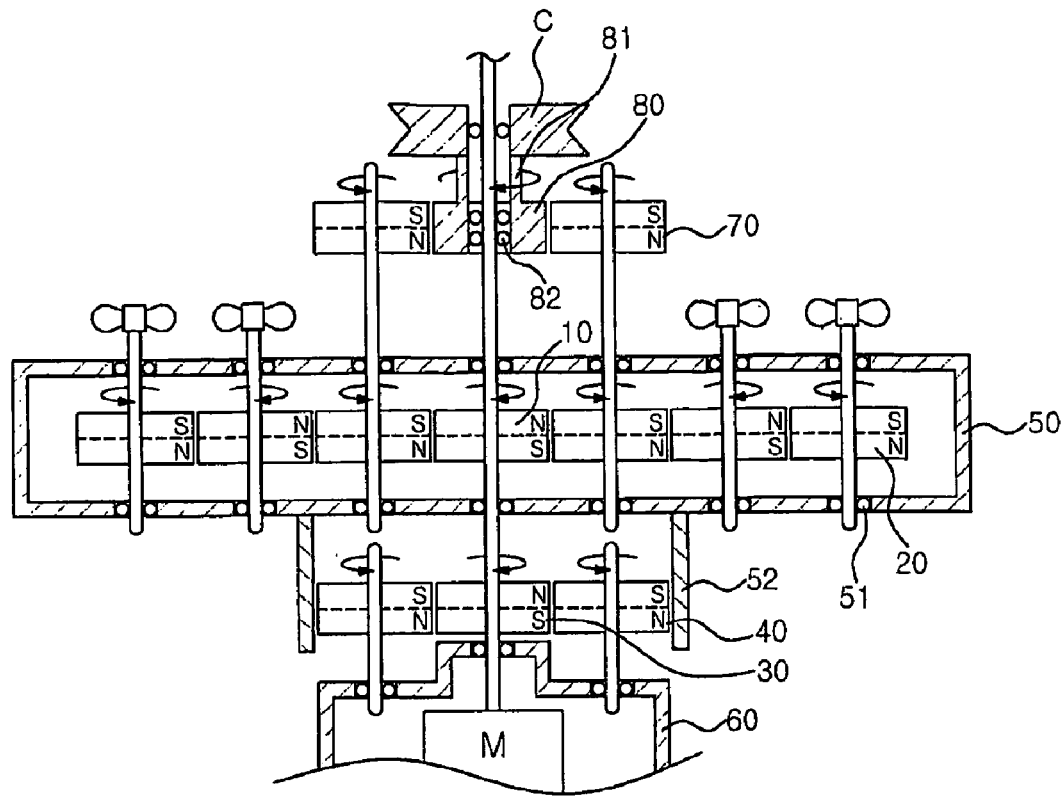
FIG. 5c is a longitudinal cross-sectional view illustrating a structure which transmits speed-changed rotational power through an interlocking rotary element and an interlocked rotary element.
Figure 5D:
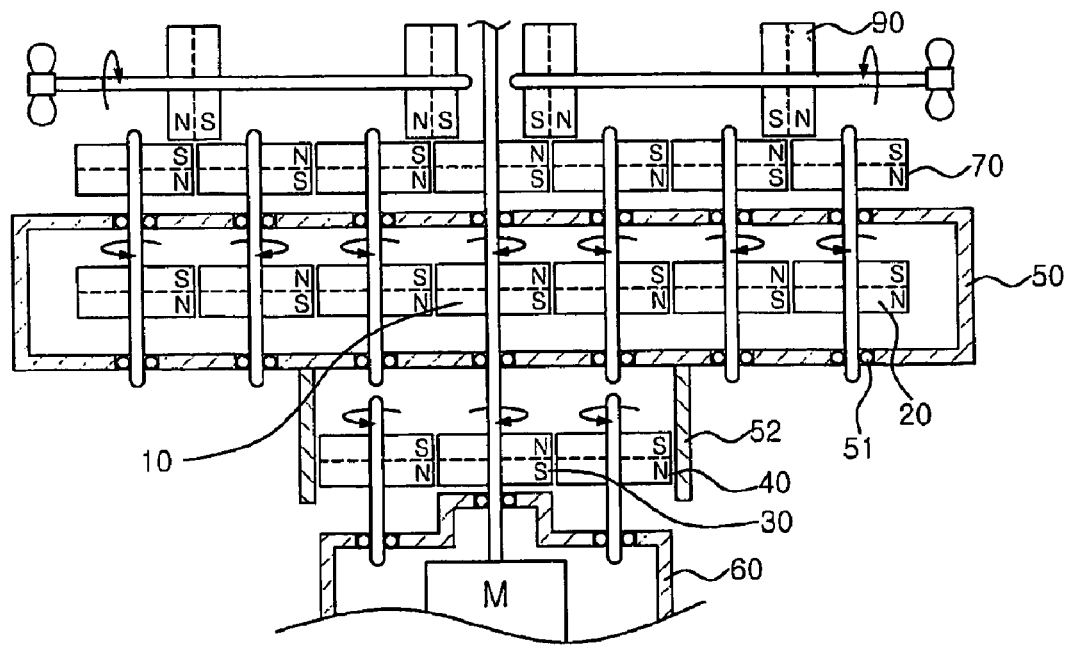
FIG. 5d is a longitudinal cross-sectional view illustrating a structure which perpendicularly transmits rotational power through perpendicular rotary elements.
Figure 5C:
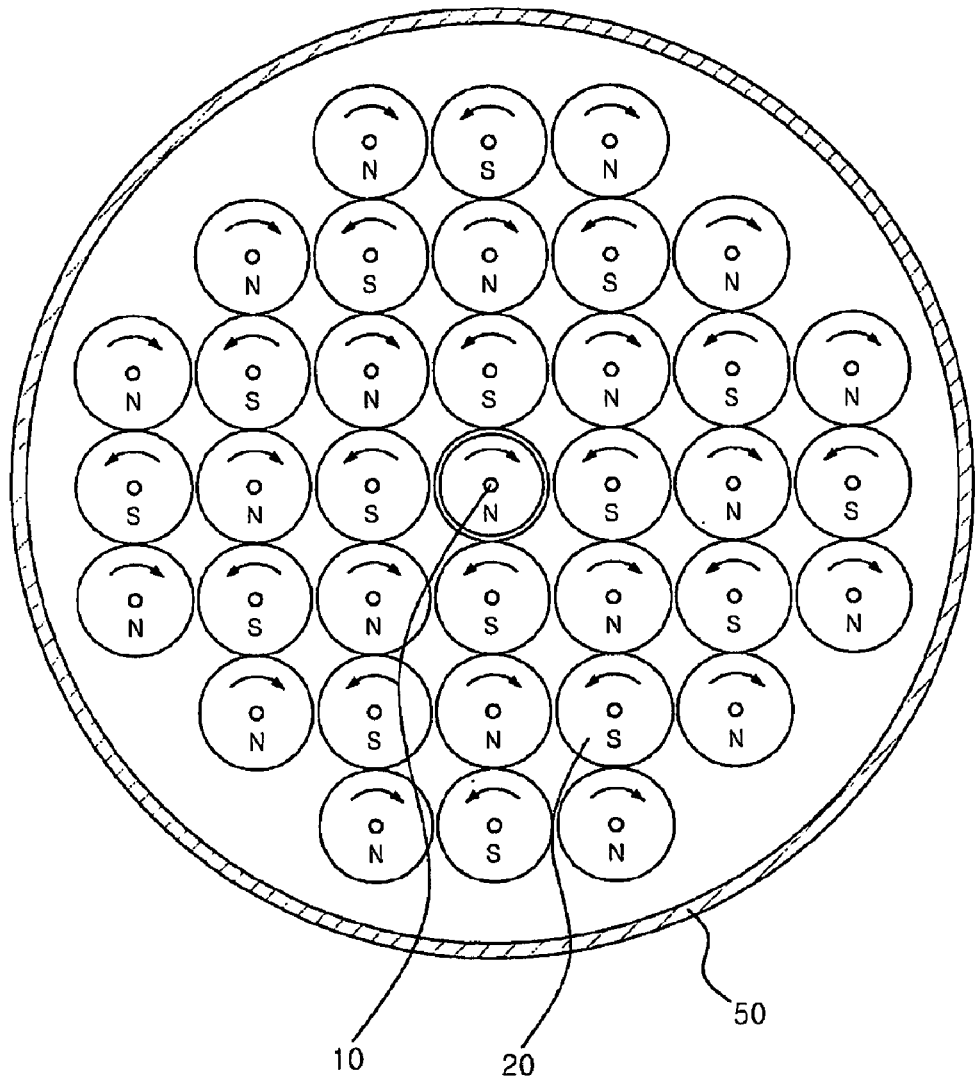

FIG. 5 is of views illustrating the apparatus for transmitting power using magnetic force in accordance with the embodiment of the present invention, which has a speed-changing function, wherein FIG. 5a is a longitudinal cross-sectional view illustrating a multi-shaft rotating structure, FIG. 5b is a longitudinal cross-sectional view illustrating a rotating structure which is obtained by removing some shafts from the multi-shaft rotating structure shown in FIG. Sa, FIG. 5c is a longitudinal cross-sectional view illustrating a structure which transmits speed-changed rotational power through an interlocking rotary element and an interlocked rotary element, FIG. 5d is a longitudinal cross-sectional view illustrating a structure which perpendicularly transmits rotational power through perpendicular rotary elements, FIG. 5e is a transverse cross-sectional view illustrating an arrangement of magnets which are provided in a housing in the structures shown in FIGS. 5a through 5d, and FIG. 5f is a transverse cross-sectional view illustrating an arrangement of magnets which are provided in a cylindrical wall secured to a lower end surface of the housing in the structures shown in FIGS. 5a through 5d.

Figure 5F:
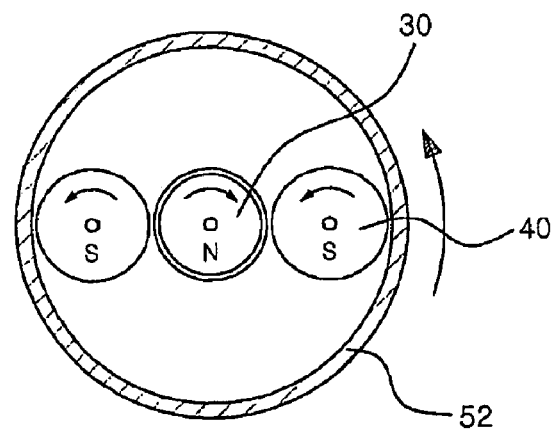
FIG. 5f is a transverse cross-sectional view illustrating an arrangement of magnets which are provided in a cylindrical wall secured to a lower end surface of the housing in the structures shown in FIGS. 5a through 5d.

Referring to FIGS. 5a, 5e and 5f, the apparatus for transmitting power using magnetic force in accordance with the embodiment of the present invention, which has a speed-changing function, comprises a driving rotary element 10, driven rotary elements 20, a housing 50, an accelerating driving magnet 30, and accelerating driven magnets 40.

The driving rotary element 10 is connected to a driving motor M to transmit rotational power, and the driven rotary elements 20 are brought into contact with the driving rotary element 10 to be relatively rotated. Each of the driving rotary element 10 and the driven rotary element 20 may comprise a double-sided bipolar disc-shaped magnet or a disc-shaped ferromagnetic. Alternatively, a pair of double-sided bipolar disc-shaped magnets can be coupled to each other with a gear interposed therebetween.

The housing 50 has a hollow disc-shaped configuration so that the driving rotary element 10 and the driven rotary elements 20 can be accommodated in the housing 50. Both ends of rotation shafts which pass through centers of the driving rotary element 10 and the driven rotary elements 20 extend through upper and lower walls of the housing 50, respectively. At this time, ball bearings 51 are fitted between the rotation shafts and the upper and lower walls of the housing 50 to minimize friction.

A cylindrical wall 52 which is opened at a lower end thereof is secured integrally to a lower end surface of the housing 50, and circumferential outer surfaces of the accelerating driven magnets 40 are attractively brought into contact with an inner surface of the cylindrical wall 52.

The accelerating driving magnet 30 is arranged between the driving motor M and the housing 50 and is rotated at the same rotational, velocity as the driving rotary element 10.

The accelerating driven magnets 40 are respectively fitted around shafts which are supported by and upwardly project from a motor housing 60 for accommodating the driving motor M. The accelerating driven magnets 40 are relatively rotated in an opposite direction to the accelerating driving magnet 30 by the rotation of the accelerating driving magnet 30, so as to rotate the housing 50.

Concretely describing a procedure for transmitting rotational power, first, a rotational driving force generated by the driving motor M simultaneously rotates the driving rotary element 10 and the accelerating driving magnet 30. The driving rotary element 10 relatively rotates the driven rotary elements 20 in an opposite direction, by which the shafts fitted through the driven rotary elements 20 are simultaneously rotated. At this time, the accelerating driving magnet 30 simultaneously rotates the accelerating driven magnets 40 in an opposite direction, and the accelerating driven magnets 40 rotate the cylindrical wall 52 to rotate the housing 50 which is integrally secured to the cylindrical wall 52. The rotation of the housing 50 accelerates the rotation of the driven rotary elements 20 which are accommodated in the housing 50, whereby a rotation velocity of the driven rotary elements 20 is increased.

Referring to FIG. 5b, in the apparatus for transmitting power using magnetic force in accordance with the embodiment of the present invention, which has a speed-changing function, the majority of the driven rotary elements 20 are removed with the rotation shafts. The reason to this is that the plurality of driven rotary elements 20 are continuously and closely located around the driving rotary element 10 to be attractively brought into contact with the driving rotary element 10 and with one another, whereby a powerful attractive supporting force is obtained.

Hence, it is preferred that the rotation shafts are fitted only through the driven rotary elements 20 which are positioned outermost in the housing 50 to ensure a minimum supporting force.

Referring to FIG. 5c, the apparatus for transmitting power using magnetic force in accordance with the embodiment of the present invention, which has a speed-changing function, further comprises one or more interlocking rotary elements 70 which are connected to the driven rotary elements 20 by shafts to be rotated integrally therewith, and an interlocked rotary element 80 which is attractively brought into contact with the interlocking rotary elements 70 and is relatively rotated in an opposite direction by the rotation of the interlocking rotary elements 70. It is preferred that the interlocking rotary element 70 comprises a double-sided bipolar disc-shaped magnet or a disc-shaped ferromagnetic, and the interlocked rotary element 80 comprises a disc-shaped ferromagnetic having integrally formed therewith a frame 81 to which a power-receiving member 'C' is connected.

The interlocking rotary elements 70 rotate at the same rotational velocity in an interlocked manner with the driven rotary elements 20, by which the interlocked rotary element 80 is rotated. The interlocked rotary element 80 is rotatably coupled to a shaft of the driving rotary element 10 by way of a ball bearing 82 to be capable of idly rotating independently of the shaft of the driving rotary element 10. The interlocked rotary element 80 is rotated in the same rotation velocity as the interlocking rotary elements 70, to rotate the power-receiving member C connected thereto by the frame 81. As a result, due to the fact that the rotational power of the driven rotary elements 20, which is changed in its rotational velocity through the rotation of the housing 50, is transmitted to the interlocked rotary element 80 as it is, to rotate the power-receiving member C, it is possible to transmit velocity-increased rotational power on the driving shaft.

Referring to FIG. 5d, the apparatus for transmitting power using magnetic force in accordance with the embodiment of the present invention, which has a speed-changing function, further comprises one or more interlocking rotary elements 70 which are connected to the driven rotary elements 20 by shafts to be rotated, and one or more perpendicular rotary elements 90 which are perpendicularly and eccentrically brought into contact with the interlocking rotary elements 70 to be rotated. At this time, each of the interlocking rotary element 70 and the perpendicular rotary element 90 comprises a double-sided bipolar disc-shaped magnet or a disc-shaped ferromagnetic.

The interlocking rotary elements 70 are rotated at the same rotational velocity in an interlocked manner with the driven rotary elements 20 which are changed in their rotational velocity. The perpendicular rotary elements 90, which are perpendicularly and eccentrically coupled to the interlocking rotary elements 70, are relatively rotated about an axis perpendicular to the axis about which the interlocking rotary elements 70 are rotated, owing to a frictional. force generated in proportion to a vertical drag force which is a magnetic attractive force induced when the interlocking rotary elements 70 are rotated, to transmit rotational power to a perpendicular direction.

Rotating decorations having various configurations can be coupled to upper ends of the driving rotary element 10, the driven rotary elements 20, the interlocking rotary elements 70 and the perpendicular rotary elements 90. These rotating decorations may be coupled directly or indirectly by way of crankshafts to rotation shafts of the respective elements. Also, it can be contemplated that small-sized generators each having light-emitting diodes are installed on the rotation shafts of the respective elements.

Figure 6A:
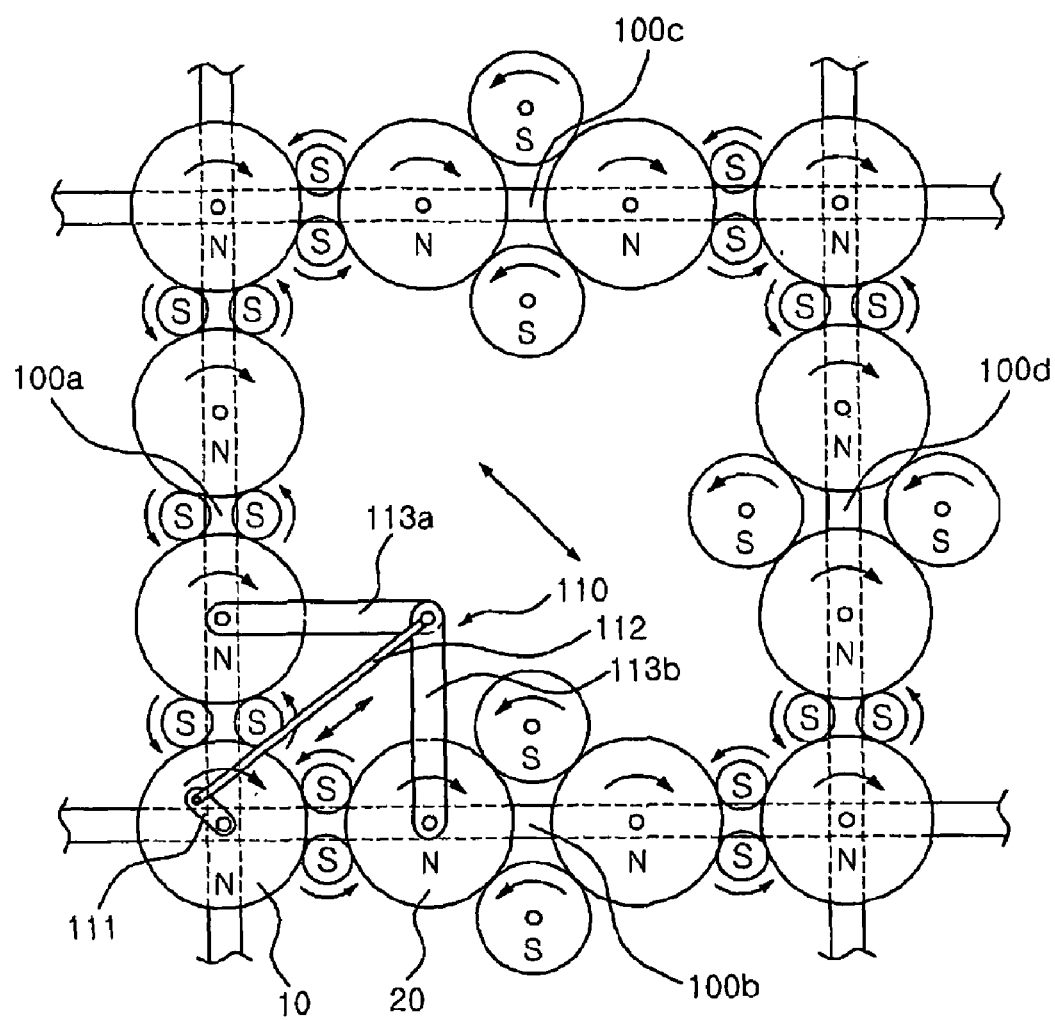
FIG. 6a illustrates a construction of a bellows mechanism.
Figure 6B:
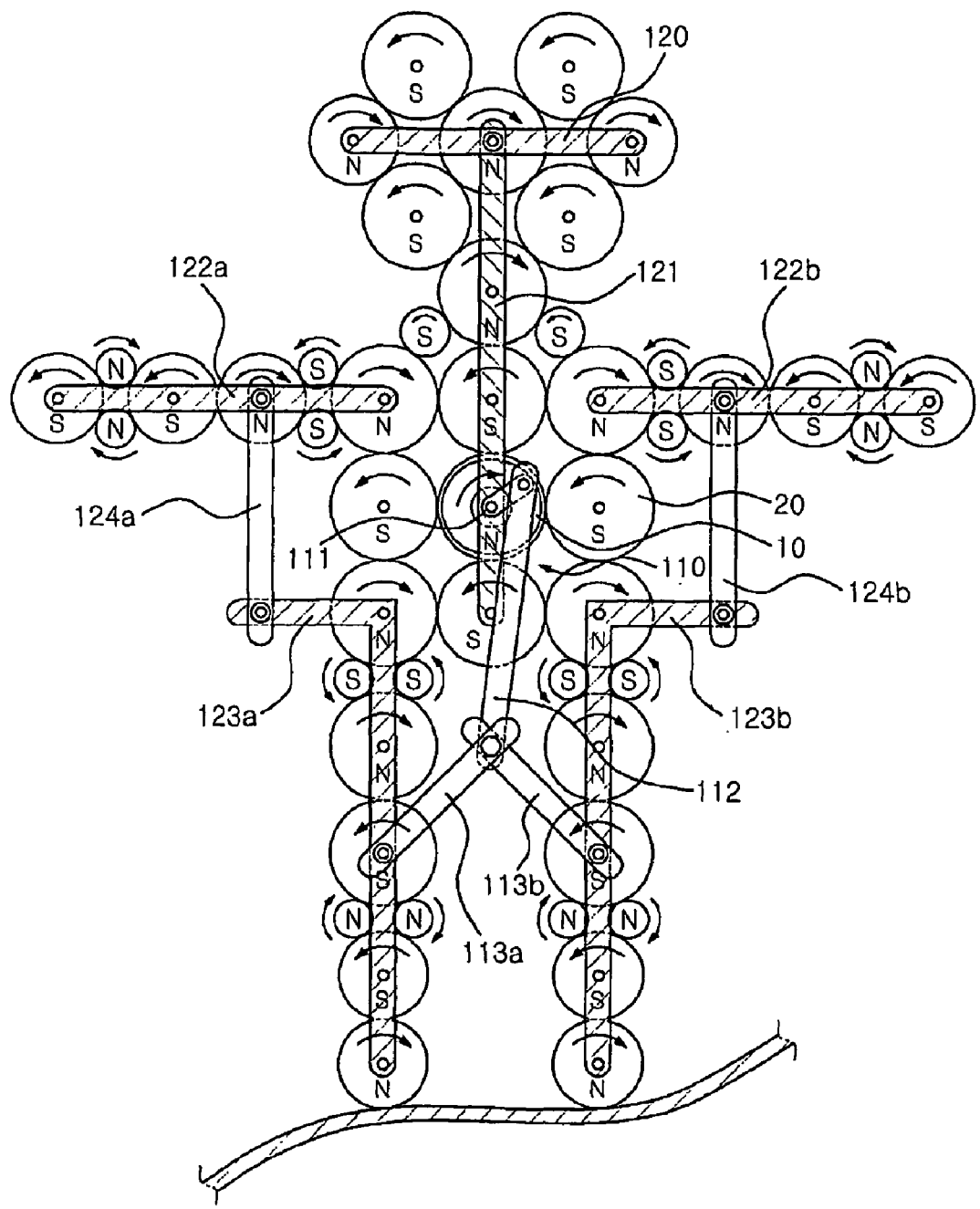
FIG. 6b illustrates a construction of a toy robot.

FIG. 6 is of views illustrating the apparatus for transmitting power using magnetic force in accordance with the embodiment of the present invention, which simultaneously implements reciprocating motion and rotating motion, wherein FIG. 6a illustrates a construction of a bellows mechanism, and FIG. 6b illustrates a construction of a toy robot.

Referring to FIG. 6a, the apparatus for transmitting power using magnetic force in accordance with the embodiment of the present invention, which simultaneously implements reciprocating motion and rotating motion, is employed to constitute a bellows mechanism. In the illustrated example, the apparatus comprises a driving rotary element 10, driven rotary elements 20, a crank device 110, and first through fourth support bars 100a, 100b, 100c and 100d.

The driving rotary element 10 is connected to a driving motor M to transmit rotational power, and the driven rotary elements 20 are brought into contact with the driving rotary element 10 to be relatively rotated. Each of the driving rotary element 10 and the driven rotary element 20 may comprise a double-sided bipolar disc-shaped magnet or a disc-shaped ferromagnetic. Alternatively, a pair of double-sided bipolar disc-shaped magnets can be coupled to each other with a gear interposed therebetween. Also, the driven rotary elements 20 can be freely changed in their sizes.

The first through fourth support bars 100a, 100b, 100c, and 100d are coupled to the driven rotary elements 20 and to one another to be integrally moved.

As the crank device 110 coupled to a corner of a combination of the support bars implements reciprocating motion, the support bars simultaneously reciprocate the driven rotary elements 20.

The crank device 110 comprises a rotation bar 111 which is fastened integrally to the driving rotary element 10, a reciprocating bar 112 which is hinged at one thereof to the rotation bar 111 to be reciprocated by the rotation of the rotation bar 111, and first and second pressing bars 113a and 113b which are hinged at both ends thereof to the first and second support bars 100a and 100b and the other end of the reciprocating bar 112, respectively.

The rotation bar 111 rotates integrally with the driving rotary element 10 and reciprocates the reciprocating bar 112. The reciprocating bar 112 reciprocates the pressing bars 113a and 113b, so that the first and second support bars 1OOa and 100b connected to the pressing bars 113a and 113b can be folded and unfolded. At this time, due to the fact that the first and second support bars 100a and 100b are hingedly coupled to the third and fourth support bars 100c and 100d, the combination of the support bars defines a rhombic configuration, and thus, the bellows mechanism can be constructed by assembling several support bar combinations.

Referring to FIG. 6b, the apparatus for transmitting power using magnetic force in accordance with the embodiment of the present invention, which simultaneously implements reciprocating motion and rotating motion, is employed to constitute a toy robot. In the illustrated embodiment, the apparatus comprises a driving rotary element 10, driven rotary elements 20, a crank device 110, a body support bar 121, arm support bars 122a and 122b, leg support bars 123a and 123b, a head support bar 120, and connection bars 124a and 124b.

The body support bar 121, arm support bars 122a and 122b, leg support bars 123a and 123b, and head support bar 120 are hingedly coupled to the driven rotary elements 20 to be integrally moved.

The crank device 110 comprises a rotation bar 111 which is fastened integrally to the driving rotary element 10, a reciprocating bar 112 which is hinged at one thereof to the rotation bar 111 to be reciprocated by the rotation of the rotation bar 111, and first and second pressing bars 113a and 113b which are hinged at both ends thereof to the leg support bars 123a and 123b and the other end of the reciprocating bar 112, respectively.

The rotation bar 111 rotates integrally with the driving rotary element 10 and reciprocates the reciprocating bar 112. The reciprocating bar 112 reciprocates the pressing bars 113a and 113b hinged thereto, so that the leg support bars 123a and 123b connected to the pressing bars 113a and 113b and having a shape of 'L' can be folded and unfolded. The leg support bars 123a and 123b can rotate and reciprocate the arm support bars 122a and 122b through the connection bars 124a and 124b.

The driven rotary elements 20 which are connected to distal ends of the leg support bars 123a and 123b can be rotated in the same direction to be moved in a state in which they are attractively coupled to a magnetic body such as a steel plate.

Therefore, by assembling wheels to the distal ends of the leg support bars 123a and 123b, a car-type toy robot can be constructed.

Hence, it is to be readily understood that the apparatus for transmitting power using magnetic force in accordance with the embodiment of the present invention, which simultaneously implements reciprocating motion and rotating motion, can be embodied in a diversity of ways by altering shapes of various bars.

Rotating decorations having various configurations can be coupled to upper ends of the driving rotary element 10 and the driven rotary elements 20. These rotating decorations may be coupled directly or indirectly by way of crankshafts to rotation shafts of the driving rotary element 10 and the driven rotary elements 20. Also, it can be contemplated that small-sized generators each having light-emitting diodes are installed on the rotation shafts of the driving rotary element 10 and the driven rotary elements 20.

Figure 7:
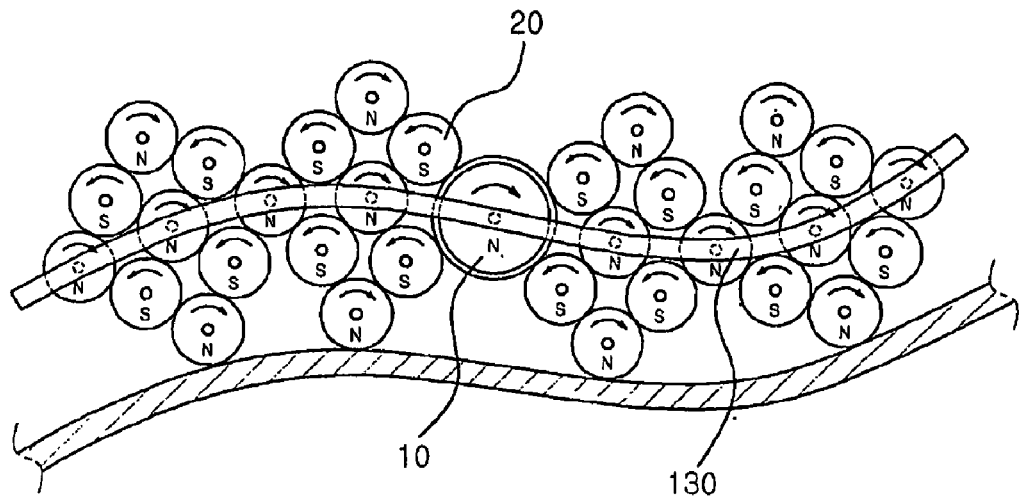
FIG. 7 is a view illustrating the apparatus for transmitting power using magnetic force in accordance with the embodiment of the present invention, which can move through rotation of rotary elements.

FIG. 7 is a view illustrating the apparatus for transmitting power using magnetic force in accordance with the embodiment of the present invention, which can move through rotation of rotary elements.

Referring to FIG. 7, the apparatus for transmitting power using magnetic force in accordance with the embodiment of the present invention, which can move through rotation of rotary elements, comprises a driving rotary element 10, driven rotary elements 20, and a moving bar 130.

The driving rotary element 10 is connected to a driving motor to transmit rotational power, and the driven rotary elements 20 are brought into contact with the driving rotary element 10 to be relatively rotated. Each of the driving rotary element 10 and the driven rotary element 20 may comprise a double-sided bipolar disc-shaped magnet or a disc-shaped ferromagnetic. Alternatively, a pair of double-sided bipolar disc-shaped magnets can be coupled to each other with a gear interposed therebetween.

The moving bar 130 connects centers of the driving rotary element 10 and the driven rotary elements 20 with each other so that the driving rotary element 10 and the driven rotary elements 20 are supported by the moving bar 130. The moving bar 130 may have various shapes depending upon a support force required.

In this regard, it is preferred that the driving motor also be coupled to and supported by the moving bar 130.

The apparatus for transmitting power using magnetic force in accordance with the embodiment of the present invention, which moves through rotation of rotary elements, can be moved in a state in which it is attractively coupled to a magnetic body such as a steel plate, while overcoming gravity with the aid of an attractive force generated from magnets. Therefore, it is possible to construct a car-type toy robot. In this regard, in order to construct a car-type toy robot, it is preferable that a wheel around which a friction ring (not shown) is fitted be connected to the rotation shaft of the driven rotary element 20.

Rotating decorations having various configurations can be coupled to upper ends of the driving rotary element 10 and the driven rotary elements 20. These rotating decorations may be coupled directly or indirectly by way of crankshafts to rotation shafts of the driving rotary element 10 and the driven rotary elements 20.

Also, it can be contemplated that small-sized generators each having light-emitting diodes are installed on the rotation shafts of the driving rotary element 10 and the driven rotary elements 20.

Figure 8A:
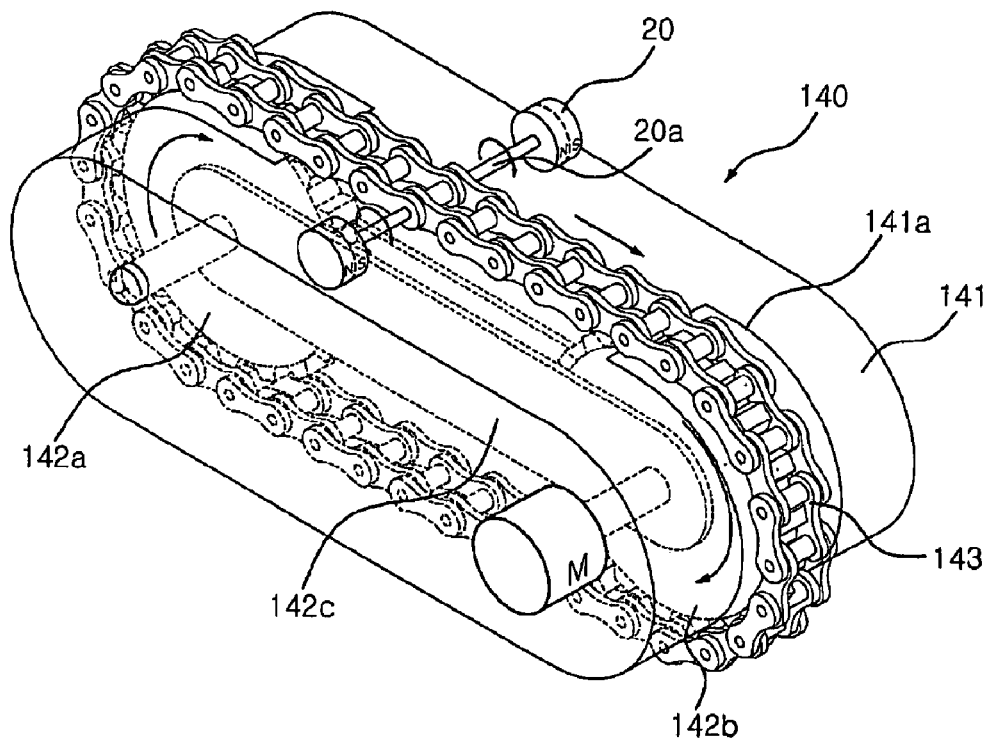
FIG. 8a is a perspective view illustrating a state in which one driven magnet is rotated on the conveyor device.
Figure 8B:
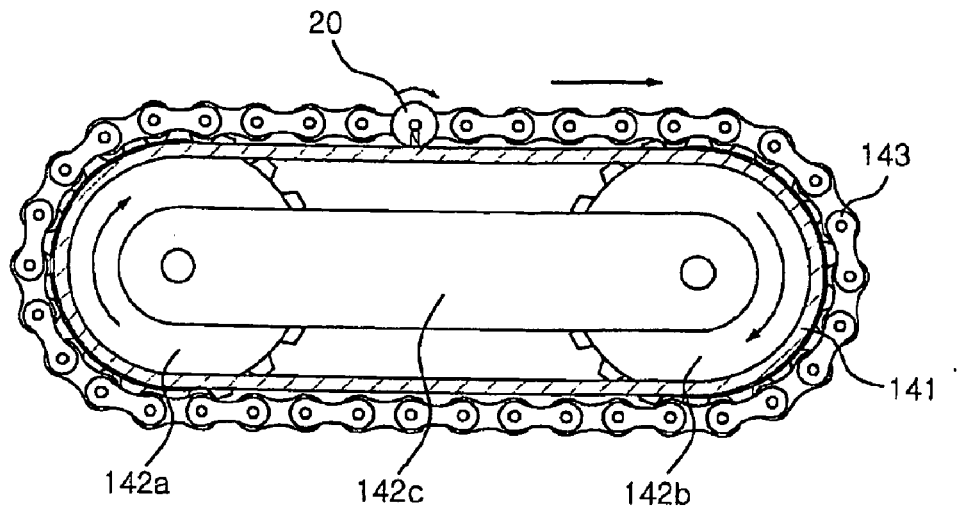
FIG. 8b is a longitudinal cross-sectional view illustrating a state in which one driven magnet is rotated on the conveyor device.
Figure 8C:
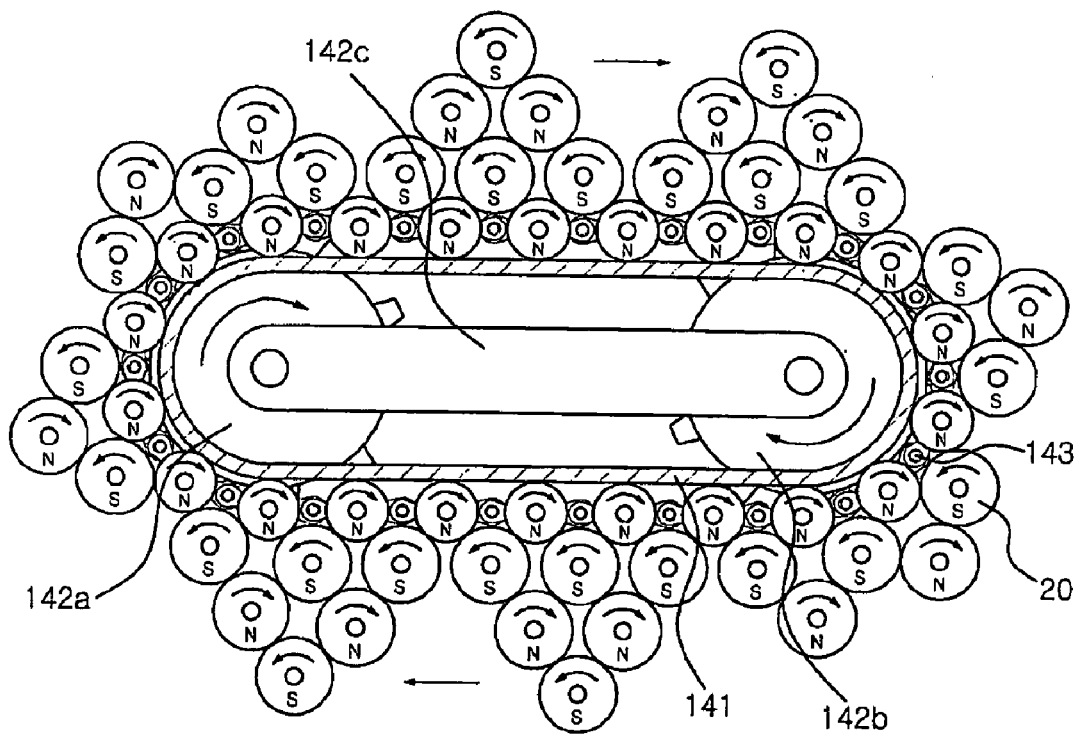
FIG. 8c is a longitudinal cross-sectional view illustrating a state in which a plurality of driven magnets connected with one another are rotated on the conveyor device.

FIG. 8 is of views illustrating the apparatus for transmitting power using magnetic force in accordance with the embodiment of the present invention, which is coupled with a conveyor device, wherein FIG. 8a is a perspective view illustrating a state in which one driven magnet is rotated on the conveyor device, FIG. 8b is a longitudinal cross-sectional view of FIG. 8a, and FIG. 8c is a longitudinal cross-sectional view illustrating a state in which a plurality of driven magnets connected with one another are rotated on the conveyor device.

Referring to FIGS. 8a and 8b, the apparatus for transmitting power using magnetic force in accordance with the embodiment of the present invention, which is coupled with a conveyor device, comprises a conveyor device 140 and driven rotary elements 20.

The driven rotary element 20 may comprise a double-sided bipolar disc-shaped magnet or a disc-shaped ferromagnetic. Alternatively, a pair of double-sided bipolar disc-shaped magnets can be coupled to each other with a gear interposed therebetween.

The conveyor device 140 comprises a housing 141, chain gears 142a and 142b, and a chain 143.

The housing 141 accommodates the chain gears 142a and 142b, and is defined at both lengthwise ends thereof with openings 141a such that the chain gears 142a and 142b are partially exposed to the outside from the housing 141 through the openings 141a. The housing 141 comprises a ferromagnetic so that it can be attractively brought into contact with the driven rotary elements 20.

The chain gears 142a and 142b function to rotate the chain 143 using the rotational power generated by a driving motor M.

The chain 143 is moved along parallel linear paths through the rotation of the chain gears 142a and 142b while being separated from the housing 141. The driven rotary elements 20 are coupled to the chain 143 through shafts so that they can be attractively brought into contact with the housing 141 and thereby be relatively rotated.

Referring to FIG. 8c, a plurality of driven rotary elements 20 are attractively brought into contact with one another on the conveyor device. In this case, the driven rotary elements 20 which are coupled to the chain 143 by the shafts are attractively brought into contact with the housing 141 and relatively rotated, so as to be interlocked with and thereby relatively rotate the other driven rotary elements 20.

Rotating decorations having various configurations can be coupled to upper ends of the driven rotary elements 20. These rotating decorations may be coupled directly or indirectly by way of crankshafts to rotation shafts of the driven rotary elements 20. Also, it can be contemplated that small-sized generators each having light-emitting diodes are installed on the rotation shafts of the driven rotary elements 20.

Figure 9A:
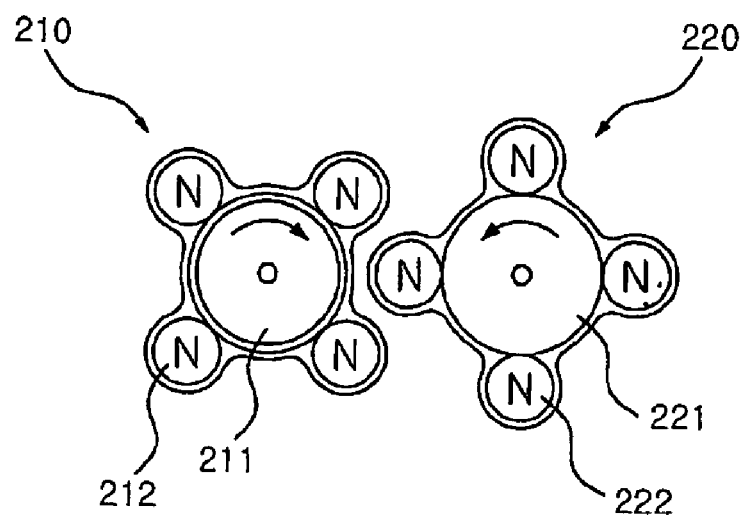
FIG. 9a is a front view illustrating a state in which driving and driven magnets having the same polarity are separated from each other and rotated by a repulsive force.
Figure 9B:
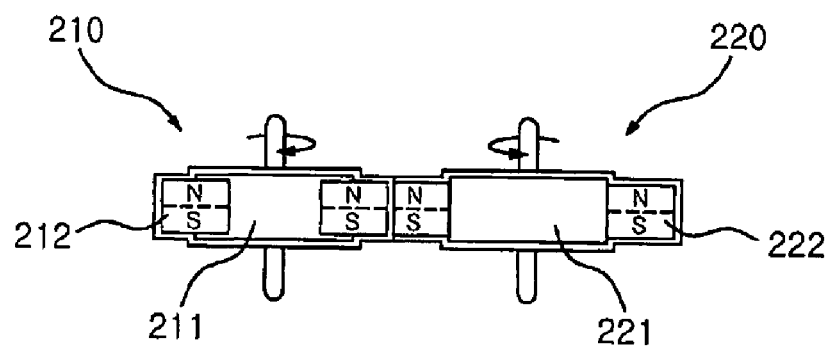
FIG. 9b is a plan view of illustrating a state in which driving and driven magnets having the same polarity are separated from each other and rotated by a repulsive force.

FIG. 9 is of views for explaining a power transmitting principle in an apparatus for transmitting power using magnetic force in accordance with another embodiment of the present invention, wherein FIG. 9a is a front view illustrating a state in which driving and driven magnets having the same polarity are separated from each other and rotated by a repulsive force, and FIG. 9b is a plan view of FIG. 9a.

Referring to FIG. 9, an apparatus for transmitting power using magnetic force comprises a driving magnet section 210 and a driven magnet section 220.

Each of the driving magnet section 210 and driven magnet section 220 comprises a cylindrical non-magnetic element 211 and 221 for defining a rotation center, and one or more double-sided bipolar disc-shaped magnets 212 and 222. which are coupled to a circumferential outer surface of the non-magnetic element 211 and 221 to be spaced apart one from another by a regular angle within a region where a repulsive force acts.

It is preferred that the cylindrical non-magnetic element 211 and 221 and the disc-shaped magnets 212 and 222 be molded together by plastic to be integrated with each other.

At this time, it is preferred that the disc-shaped magnets 222 of the driven magnet section 220 be sequentially fitted between two adjoining disc-shaped magnets 212 of the driving magnet section 210. It is also preferred that the driven magnet section 220 comprise four disc-shaped magnets 222 which are spaced apart by 90°.

If the driving magnet section 210 is rotated by a driving motor, the driven magnet section 220, which has the same polarity as the driving magnet section 210 and is located separately from the driving magnet section 210, is relatively rotated at the same velocity as the driving magnet section 210 by a repulsive force of the driving magnet section 210. Consequently, rotational power can be transmitted with minimum power loss without using separate connection members, and thereby it is possible to construct rotating devices and products having a diversity of configurations.

In the meanwhile, each of the driving magnet section 210 and driven magnet section 210 may comprise a double-sided bipolar magnet having a circumferential outer surface which is undulated into the combined shape of prominences and depressions.

Figure 10:
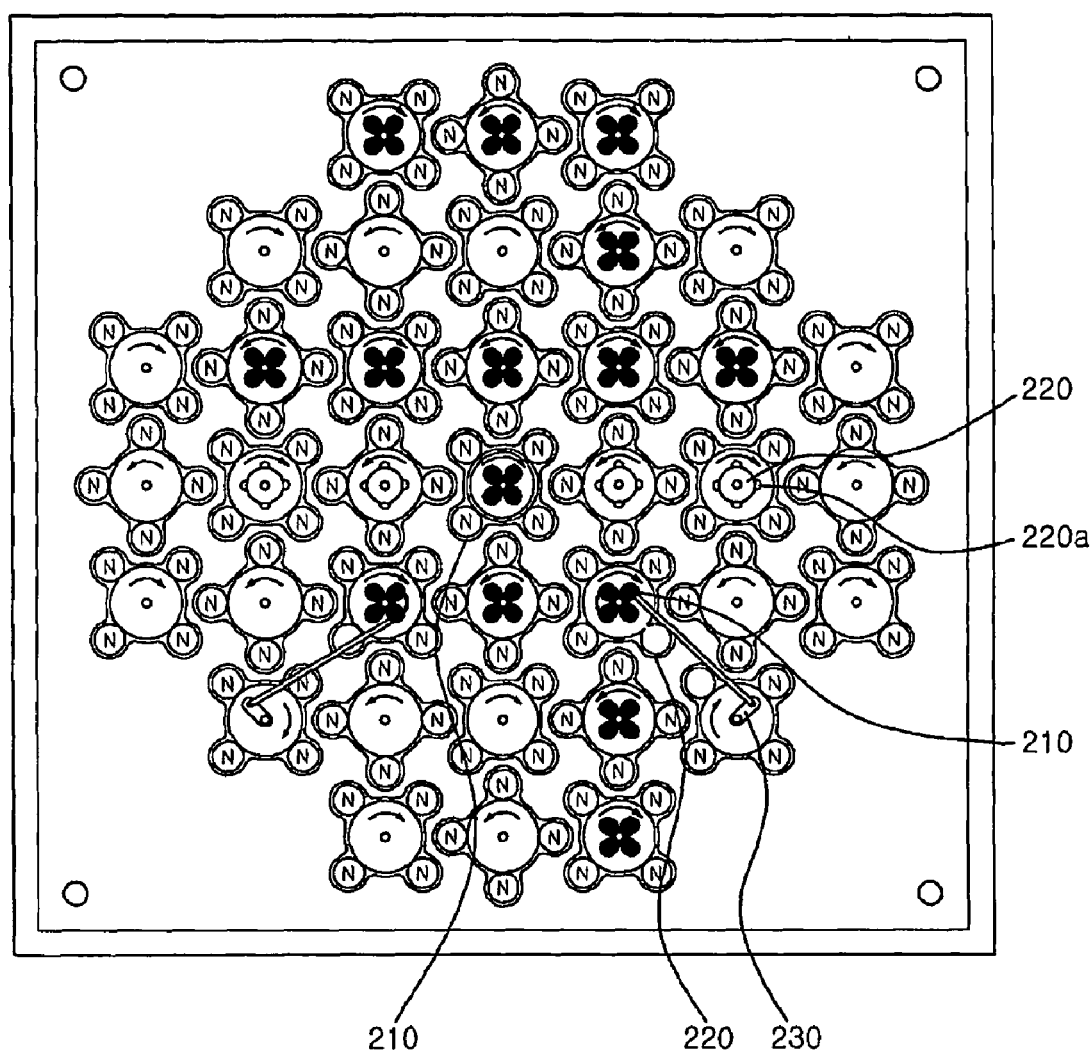
FIG. 10 is a plan view illustrating a state in which decorations having various shapes are coupled to the apparatus for transmitting power using magnetic force in accordance with another embodiment of the present invention.

FIG. 10 is a plan view illustrating a state in which decorations having various shapes are coupled to the apparatus for transmitting power using magnetic force in accordance with another embodiment of the present invention.

Referring to FIG. 10, a driving magnet section 210 which is driven by a driving motor to be rotated is located at a center, and a plurality of driven magnet sections 220 are continuously and closely located around the driving magnet section 210 to be attractively brought into contact with the driving magnet section 210 and with one another.

Each of the driving magnet section 210 and the driven magnet sections 220 may comprise a combination of a disc-shaped cylindrical ferromagnetic and one or more disc-shaped magnets which are coupled to a circumferential outer surface of the cylindrical ferromagnetic. Alternatively, Each of the driving magnet section 210 and the driven magnet sections 220 may comprise a double-sided bipolar magnet having a circumferential outer surface which is undulated into the combined shape of prominences and depressions.

Rotating decorations 210 having various configurations can be coupled to upper ends of the driving and driven magnet sections 210 and 220. The rotating decorations 210 may be coupled directly or indirectly by way of crankshafts 230 to rotation shafts of the driving and driven magnet sections 210 and 220. In the case of direct coupling, the rotating decorations 210 simply implement rotating motion.

In the case indirect coupling by way of the crankshafts 230, the rotating decorations 210 implement rotating motion and reciprocating motion. In the illustrated example, the rotating decorations directly coupled to the rotation shafts of the driving and driven magnet sections denoted by the Korean letter which is read as 'guk' in English and implement rotating motion, and the rotating decorations indirectly coupled by way of the crankshafts 230 to the rotation shafts of the driving and driven magnet sections implement reciprocating and rotating motions due to the presence of the crankshafts 230. To this end, the rotating decorations coupled to the crankshafts 230 are coupled to the driven magnet sections to idly rotate about the rotation shafts of the driven magnet sections.

Also, it can be contemplated that small-sized generators 220 each having light-emitting diodes 220a are installed on the rotation shafts of the driven rotary elements 20. The small-sized generators 220 can be applied to wheels of an in-line skate or wheels of a bicycle on the basis of the same principle. Due to the fact that rotational power transmitted by the driving motor is converted into electrical energy by the small-sized generators 220 to turn on the light-emitting diodes 220a, the structure can be advantageously employed in a product which has a partitioning member or rotates at a high velocity so that it is difficult to lay electric wires in the product.

As described above, in the apparatus for transmitting power using magnetic force according to this embodiment of the present invention, since the rotating decorations having a variety of shapes can be coupled in a diversity of ways to the driving and driven magnet sections, various decorative patterns, advertising signs, toys, etc. can be easily constructed with a simple structure.

Figure 11A:
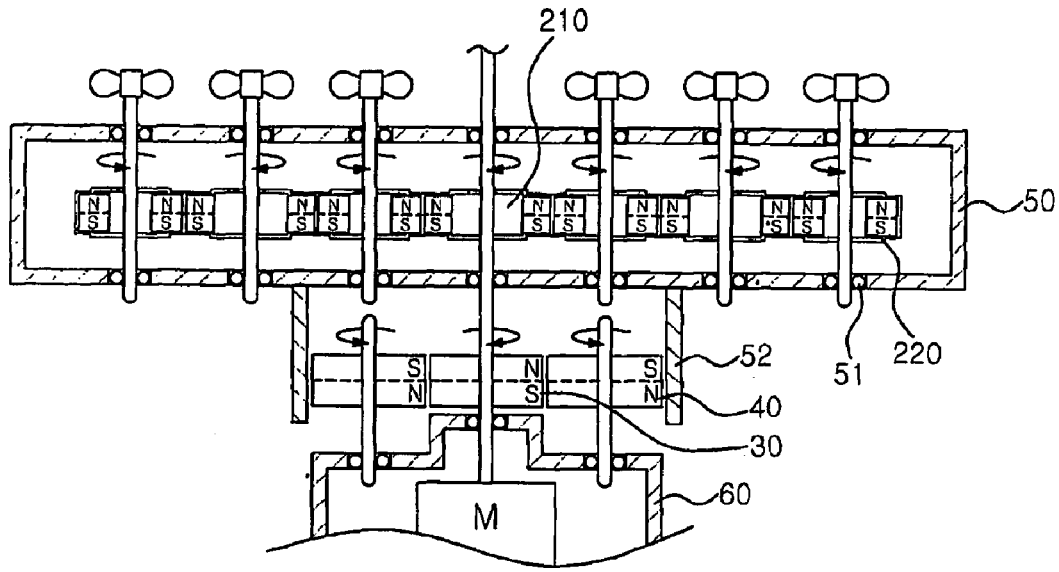
FIG. 11a is a longitudinal cross-sectional view illustrating a multi-shaft rotating structure.
Figure 11B:
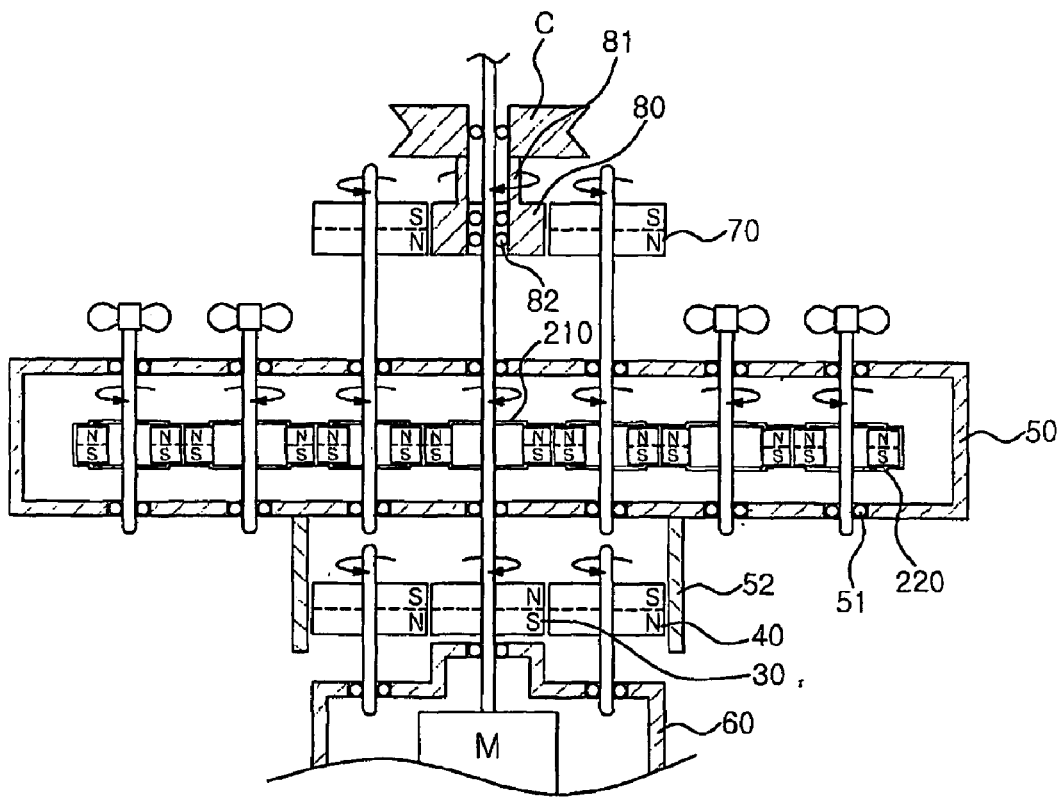
FIG. 11b is a longitudinal cross-sectional view illustrating a structure which transmits speed-changed rotational power through an interlocking rotary element and an interlocked rotary element.

FIG. 11 is of views illustrating the apparatus for transmitting power using magnetic force in accordance with another embodiment of the present invention, which has a speed-changing function, wherein FIG. 11a is a longitudinal cross-sectional view illustrating a multi-shaft rotating structure, and FIG. 11b is a longitudinal cross-sectional view illustrating a structure which transmits speed-changed rotational power through an interlocking rotary element and an interlocked rotary element.

Referring to FIG. 11a, the apparatus for transmitting power using magnetic force in accordance with another embodiment of the present invention, which has a speed-changing function, comprises a driving magnet section 210, driven magnet sections 220, a housing 50, an accelerating driving magnet 30, and accelerating driven magnets 40.

Each of the driving magnet section 210 and the driven magnet sections 220 may comprise a combination of a disc-shaped cylindrical ferromagnetic and one or more disc-shaped magnets which are coupled to a circumferential outer surface of the cylindrical ferromagnetic. Alternatively, Each of the driving magnet section 210 and the driven magnet sections 220 may comprise a double-sided bipolar magnet having a circumferential outer surface which is undulated into the combined shape of prominences and depressions.

The housing 50 has a hollow disc-shaped configuration so that the driving magnet section 210 and the driven magnet sections 220 can be accommodated in the housing 50. Both ends of rotation shafts which pass through centers of the driving magnet section 210 and the driven magnet sections 220 extend through upper and lower walls of the housing 50, respectively. At this time, ball bearings 51 are fitted between the rotation shafts and the upper and lower walls of the housing 50 to minimize friction.

A cylindrical wall 52 which is opened at a lower end thereof is secured integrally to a lower end surface of the housing 50, and circumferential outer surfaces of the accelerating driven magnets 40 are attractively brought into contact with an inner surface of the cylindrical wall 52.

The accelerating driving magnet 30 is arranged between the driving motor M and the housing 50 and is rotated at the same rotational velocity as the driving magnet section 210.

The accelerating driven magnets 40 are respectively fitted around shafts which are supported by and upwardly project from a motor housing 60 for accommodating the driving motor M. The accelerating driven magnets 40 are relatively rotated in an opposite direction by the rotation of the accelerating driving magnet 30, to rotate the housing 50.

Concretely describing a procedure for transmitting rotational power, first, a rotational driving force generated by the driving motor M simultaneously rotates the driving magnet section 210 and the accelerating driving magnet 30. The driving magnet section 210 relatively rotates the driven magnet sections 220 in an opposite direction by a repulsive force, by which the shafts fitted through the driven magnet sections 220 are simultaneously rotated. At this time, the accelerating driving magnet 30 simultaneously rotates the accelerating driven magnets 40 in an opposite direction, and the accelerating driven magnets 40 rotate the cylindrical wall 52 to rotate the housing 50 which is integrally secured to the cylindrical wall 52. The rotation of the housing 50 accelerates the rotation of the driven magnet sections 220 which are accommodated in the housing 50, to increase a rotation velocity.

Referring to FIG. 11b, the apparatus for transmitting power using magnetic force in accordance with the embodiment of the present invention, which has a speed-changing function, further comprises one or more interlocking rotary elements 70 which are connected to the driven magnet sections 220 by shafts to be rotated, and an interlocked rotary element 80 which is attractively brought into contact with the interlocking rotary elements 70 and is relatively rotated in an opposite direction by the rotation of the interlocking rotary elements 70. At this time, it is preferred that the interlocking rotary element 70 comprises a double-sided bipolar disc-shaped magnet or a disc-shaped ferromagnetic, and the interlocked rotary element 80 comprises a disc-shaped ferromagnetic having integrally formed therewith a frame 81 to which a power-receiving member 'C' is connected.

The interlocking rotary elements 70 rotate at the same rotation velocity in an interlocked manner with the driven magnet sections 220, by which the interlocked rotary element 80 is rotated. The interlocked rotary element 80 is rotatably coupled to a shaft of the driving magnet section 210 by way of a ball bearing 82 to be capable of idly rotating independently of the shaft of the driving magnet section 210. The interlocked rotary element 80 is rotated in the same rotational velocity as the interlocking rotary elements 70, to rotate the power-receiving member C connected thereto by the frame 81. As a result, due to the fact that the rotational power of the driven magnet sections 220, which is changed in its rotational velocity through the rotation of the housing 50, is transmitted to the interlocked rotary element 80 as it is, to rotate the power-receiving member C, it is possible to transmit velocity-increased rotational power on the driving shaft.

Rotating decorations having various configurations can be coupled to upper ends of the driving magnet section 210 and the driven magnet sections 220. These rotating decorations may be coupled directly or indirectly by way of crankshafts to rotation shafts of the respective sections. Also, it can be contemplated that small-sized generators each having light-emitting diodes are installed on the rotation shafts of the respective sections.

Industrial Applicability As apparent from the above descriptions, the apparatus and method for transmitting power using magnetic force according to the present invention provides advantages in that, since a plurality of driven rotary elements are relatively rotated by driving one driving rotary element, the number of component parts required to serve as connection members decreases, a construction of the apparatus is simplified, and mechanical friction and operation noise are significantly reduced.

Also, because a contact area between rotary elements is minimized (by causing a line contact state in the case of coupling by an attraction force, or a non-contact state in the case of coupling by a repulsive force), energy loss due to frictional contact and power loss due to rotational friction between a plurality of component parts are reduced, and energy utilization efficiency is improved.

Further, due to the fact that rotating decorations having a variety of shapes are coupled to a plurality of driven rotary elements relatively rotated by one driving rotary element, various decorative patterns, advertising signs, toys, etc. can be easily constructed with a simple structure. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for transmitting power using magnetic force, comprising:
   a driving rotary element rotated by a driving motor; and
   at least one driven rotary element brought into contact with the driving rotary element by an attractive force and rotated in an opposite direction relative to the driving rotary element by rotation of the driving rotary element;
   wherein each of the driving rotary elements and the driven rotary elements includes a double-sided bipolar disc-shaped magnet or a disc-shaped ferromagnetic, and a circumferential outer surface of the driven rotary element is attractively brought into contact with a circumferential outer surface of the driving rotary element or another driven rotary element, to be relatively rotated.

2. The apparatus as claimed in claim 1 wherein each of the driving rotary element and the driven rotary element comprises:
a pair of attracting means each composed of a double-sided bipolar disc-shaped magnet;
a gear interposed between the pair of attracting means; and
release prevention plates attached to end surfaces of the attracting means, respectively, to prevent the driving and driven rotary elements which are brought into contact with each other, from being released.

3. The apparatus as claimed in claim 2, wherein a circumferential outer surface of each attracting means is brought into contact with a circumferential outer surface of attracting means of another driven rotary element, and the gear is meshed with a gear of the another driven rotary element to be relatively rotated.

4. The apparatus as claimed in claim 1, further comprising:
a housing for accommodating the driving rotary element and the driven rotary element;
an accelerating driving magnet rotatably connected between and to the driving motor and the housing; and
an accelerating driven magnet attractively brought into contact with the accelerating driving magnet and the housing, and
rotated in an opposite direction relative to the accelerating driving magnet by rotation of the accelerating driving magnet to accelerate the housing.

5. The apparatus as claimed in claim 4, wherein a cylindrical wall is secured to a lower end surface of the housing, and a circumferential outer surface of the accelerating driven magnet is brought into contact with an inner surface of the cylindrical wall.

6. The apparatus as claimed in claim 4, further comprising:
at least one interlocking rotary element connected to the driven rotary element by a shaft, to be integrally rotated therewith; and
an interlocked rotary element rotatably coupled to a shaft of the driving rotary element by way of a bearing, attractively brought into contact with the interlocking rotary element, and rotated in an opposite direction relative to the interlocking rotary element by rotation of the interlocking rotary element.

7. The apparatus as claimed in claim 6, wherein the interlocking rotary element comprises a double-sided bipolar disc-shaped magnet or a disc-shaped ferromagnetic.

8. The apparatus as claimed in claim 6, wherein the interlocked rotary element comprises a disc-shaped ferromagnetic having integrally formed therewith a frame to which a power-receiving member is connected.

9. The apparatus as claimed in claim 6, wherein a circumferential outer surface of the interlocking rotary element is brought into contact with a circumferential outer surface of the interlocked rotary element, to be relatively rotated.

10. The apparatus as claimed in claim 4, further comprising:
at least one interlocking rotary element positioned outside the housing, and connected to the driven rotary element by a shaft, to be integrally rotated therewith; and
at least one perpendicular rotary element perpendicularly and eccentrically brought into contact with the interlocking rotary element, to be rotated.

11. The apparatus as claimed in claim 10, wherein each of the interlocking rotary element and the perpendicular rotary element comprises a double-sided bipolar disc-shaped magnet or a disc-shaped ferromagnetic.

12. The apparatus as claimed in claim 1, further comprising:
a motion conversion device for converting rotating motion of the driving rotary element into linear motion; and
support bars coupled to the driven rotary element to reciprocate the driven rotary element by reciprocating motion of the motion conversion device.

13. The apparatus as claimed in claim 12, wherein the motion conversion device comprises a cam device or a crank device.

14. The apparatus as claimed in claim 1, further comprising a wheel around which a friction ring is fitted, wherein the wheel is connected to the rotation shaft of the driven rotary element.

15. The apparatus as claimed in claim 1, wherein the driving rotary element comprises a conveyor device comprising:
a chain coupled to the driven rotary element by a shaft;
chain gears for rotatably driving the chain by rotational power of the driving rotary element; and
a housing for accommodating the chain gears such that the chain gears are partially exposed to the outside through the housing.

16. The apparatus as claimed in claim 15, wherein the driven rotary element coupled to the chain by the shaft is brought into contact with an outer surface of the housing, to be relatively rotated by rotation of the chain.

17. The apparatus as claimed in claim 15, wherein a circumferential outer surface of the driven rotary element is attractively brought into contact with a circumferential outer surface of another driven rotary element, to be relatively rotated.

18. The apparatus as claimed in claim 15, wherein each of the driving rotary element and the driven rotary element comprises:
a pair of attracting means each composed of a double-sided bipolar disc-shaped magnet; a gear interposed between the pair of attracting means; and
release prevention plates attached to end surfaces of the attracting means, respectively, to prevent the driving and driven rotary elements which are brought into contact with each other, from being released.

19. The apparatus as claimed in claim 18, wherein a circumferential outer surface of each attracting means is brought into contact with a circumferential outer surface of attracting means of another driven rotary element, and the gear is meshed with a gear of the another driven rotary element to be relatively rotated.

20. An apparatus for transmitting power using magnetic force, comprising:
a driving magnet section rotated by a driving motor; and
at least one driven magnet section having the same polarity as the driving magnet section, and separated from the driving magnet section to be rotated in an opposite direction relative to the driving magnet section by a repulsive force of the driving magnet section, wherein each of the driving magnet section and driven magnet section comprises:
a cylindrical non-magnetic element for defining a rotation center; and
at least one double-sided bipolar disc-shaped magnets coupled to a circumferential outer surface of the non-magnetic element to be spaced apart one from another by a regular angle.

21. The apparatus as claimed in claim 20, wherein each of the driving magnet section and driven magnet section comprises: a double-sided bipolar magnet having a circumferential outer surface undulated into the combined shape of prominences and depressions.

22. The apparatus as claimed in claim 20, further comprising:
- a housing for accommodating the driving magnet section and the driven magnet section;
- an accelerating driving magnet rotatably connected between and to the driving motor and the housing; and
- an accelerating driven magnet attractively brought into contact with the accelerating driving magnet and the housing, and rotated in an opposite direction relative to the accelerating driving magnet by rotation of the accelerating driving magnet to accelerate the housing.

23. The apparatus as claimed in claim 22, wherein a cylindrical wall is secured to a lower end surface of the housing, and a circumferential outer surface of the accelerating driven magnet is brought into contact with an inner surface of the cylindrical wall.

24. The apparatus as claimed in claim 20, further comprising:
- at least one interlocking rotary element connected to the driven magnet section by a shaft, to be integrally rotated therewith; and
- an interlocked rotary element rotatably coupled to a shaft of the driving magnet section by way of a bearing, attractively brought into contact with the interlocking rotary element, and rotated in an opposite direction relative to the interlocking rotary element by rotation of the interlocking rotary element.

25. The apparatus as claimed in claim 24, wherein the interlocking rotary element comprises a double-sided bipolar disc-shaped magnet or a disc-shaped ferromagnetic.

26. The apparatus as claimed in claim 24, wherein the interlocked rotary element comprises a disc-shaped ferromagnetic having integrally formed therewith a frame to which a power-receiving member is connected.

27. The apparatus as claimed in claim 24, wherein a circumferential outer surface of the interlocking rotary element is brought into contact with a circumferential outer surface of the interlocked rotary element, to be relatively rotated.

28. A method for transmitting power using magnetic force, comprising the step of: bringing, by an attractive force, a circumferential outer surface of a disc-shaped driving rotary element rotated by a driving motor into contact with a circumferential outer surface of at least one disc-shaped driven rotary element, and thereby rotating the driven rotary element in an opposite direction relative to the driving rotary element by rotation of the driving rotary element, wherein each of the driving rotary element and the driven rotary element includes:
- a pair of attracting means each composed of a double-sided bipolar disc-shaped magnet; a gear interposed between the pair of attracting means; and
- release prevention plates attached to end surfaces of the attracting means, respectively, to prevent the driving and driven rotary elements which are brought into contact with each other, from being released.

29. The method as claimed in claim 28, wherein a circumferential outer surface of each attracting means is brought into contact with a circumferential outer surface of attracting means of another driven rotary element, and the gear is meshed with a gear of the another driven rotary element to be relatively rotated.

30. A method for transmitting power using magnetic force, comprising locating a driving magnet section rotated by a driving motor and at least one driven magnet section having the same polarity as the driving magnet section distinctly from the driving magnet, and rotating the driven magnet section in an opposite direction relative to the driving magnet section by a repulsive force through rotation of the driving magnet section, wherein each of the driving magnet section and driven magnet section comprises: a cylindrical non-magnetic element for defining a rotation center; and one or more double-sided bipolar disc-shaped magnets coupled to a circumferential outer surface of the non-magnetic element to be spaced apart one from another by a regular angle.

31. A method for transmitting power using magnetic force, comprising: locating: a driving magnet section rotated by a driving motor and at least one driven magnet section having the same polarity as the driving magnet section distinctly from the driving magnet, and rotating the driven magnet section in an opposite direction relative to the driving magnet section by a repulsive force through rotation of the driving magnet section, wherein each of the driving magnet section and driven magnet section comprises a double-sided bipolar magnet having a circumferential outer surface which is undulated into the combined shape of prominences and depressions.

* * * * *